(12) United States Patent
Sakuma et al.

(10) Patent No.: US 7,046,872 B2
(45) Date of Patent: May 16, 2006

(54) OPTICAL SWITCH, OPTICAL ADD-DROP MODULE, AND OPTICAL COMMUNICATION SYSTEM

(75) Inventors: Ken Sakuma, Sakura (JP); Daigo Fujita, Sakura (JP); Hirokuni Ogawa, Sakura (JP); Koji Omichi, Sakura (JP); Hideyuki Hosoya, Sakura (JP)

(73) Assignee: Fujikura Ltd., Tokyo (JP)

( * ) Notice: Subject to any disclaimer, the term of this patent is extended or adjusted under 35 U.S.C. 154(b) by 75 days.

(21) Appl. No.: 10/367,948

(22) Filed: Feb. 19, 2003

(65) Prior Publication Data

US 2003/0210855 A1 Nov. 13, 2003

(30) Foreign Application Priority Data

Feb. 19, 2002 (JP) ............................. 2002-042110
Jul. 19, 2002 (JP) ............................. 2002-211386

(51) Int. Cl.
*G02B 6/26* (2006.01)

(52) U.S. Cl. .............................. 385/16; 385/21; 385/45
(58) Field of Classification Search .................. 385/16, 385/40, 21, 45
See application file for complete search history.

(56) References Cited

U.S. PATENT DOCUMENTS

| 5,013,113 | A | * | 5/1991 | Soref ........................... 385/17 |
| 5,157,744 | A | * | 10/1992 | Korotky ......................... 385/2 |
| 5,481,636 | A | * | 1/1996 | Fukuda et al. .............. 385/122 |
| 5,630,004 | A | * | 5/1997 | Deacon et al. .............. 385/129 |
| 5,712,935 | A | * | 1/1998 | Miyakawa ................... 385/22 |
| 5,757,990 | A | * | 5/1998 | Miyakawa ................... 385/16 |
| 6,128,424 | A | * | 10/2000 | Gampp et al. ................ 385/14 |
| 6,215,935 | B1 | * | 4/2001 | Dagens et al. .............. 385/131 |
| 6,587,609 | B1 | * | 7/2003 | Lee et al. ..................... 385/16 |
| 6,741,775 | B1 | * | 5/2004 | Sakuma et al. ............... 385/45 |
| 2001/0055440 | A1 | * | 12/2001 | Sakuma et al. ............... 385/16 |
| 2002/0085791 | A1 | * | 7/2002 | Kim ............................ 385/16 |
| 2003/0026523 | A1 | * | 2/2003 | Chua et al. ................... 385/16 |

FOREIGN PATENT DOCUMENTS

JP 04-356030 12/1992

(Continued)

OTHER PUBLICATIONS

J. Kobayashi et al., "Fluorinated Polyimide Waveguides with Low Polarization-Dependent Loss and Their Applications to Thermooptic Switches," J. Lightwave Technol., vol. 16, No. 6, pp. 1024-1029 (Jun. 1998).

(Continued)

*Primary Examiner*—Ellen E. Kim
(74) *Attorney, Agent, or Firm*—Blank Rome LLP

(57) ABSTRACT

This two input two output type optical switch includes four one input two output type optical switches which are arranged to oppose one another, each of these one input two output type optical switches including a Y branch portion in which one optical waveguide is branched into two optical waveguides. And two refractive index adjustment means are provided in the vicinity of each Y branch portion. Switching over of the optical path is performed by half of the refractive index adjustment means functioning alternately. Moreover, a light output intensity variable attenuation function which attenuates by any desired amount the intensity of the light which is being outputted is implemented, at some input port and/or output port, by operating at least one of the refractive index adjustment means which is not currently being used for switching over of the optical path.

21 Claims, 16 Drawing Sheets

FOREIGN PATENT DOCUMENTS

| | | |
|---|---|---|
| JP | 05-216079 | 8/1993 |
| JP | 06-067232 | 3/1994 |
| JP | 06-075256 | 3/1994 |
| JP | 2002-196378 | 7/2002 |
| WO | WO 87/0182 | 3/1987 |

OTHER PUBLICATIONS

T. Ido et al., "A 1 ×8 digital-optical switch using fluorinated-polyimide waveguides," in OFC '98 Technical Digest, San Jose, 1998, WH6, pp. 148-149.

L. Eldada et al., "Thereto-optically active polymeric photonic components," in OFC 2000 Technical Digest, Baltimore, 2000, WH 1, pp. 124-126.

N. Ooba et al., "Low crosstalk and low loss 1×8 digital optical switch using silicone resin waveguides," Electronics Letters, vol. 35, No. 16, pp. 1364-1365 (Aug. 5, 1999).

W. Horsthuis et al., "Packaged polymeric 1×8 digital optical switches," in Proc. 21st Eur. Conf. on Opt. Comm. (EC0C '95), Brussels, 1995. Th.L.3.4, pp. 1059-1062.

K. Sakuma et al., "Low Insertion-loss and high isolation polymeric Y-branching thereto-optic switch with partitioned heater," in OFC 2001 Technical Digest, Anaheim, 2001, WR3.

K. Sakuma et al., "Polymer Y-branching Thereto-optic Switch For Optical Fiber Communication Systems," in The Eighth Microoptics Conference (MOC' 01) Technical Digest, Senri Osaka, Japan, 2001, L3: pp. 360-363.

\* cited by examiner

OPTICAL SWITCH, OPTICAL ADD-DROP MODULE, AND OPTICAL COMMUNICATION SYSTEM

BACKGROUND OF THE INVENTION

1. Field of the Invention

The present invention relates to an optical switch, and more particularly relates to an optical switch of a type which is improved by providing a light output intensity variable attenuation function to a two input two output crossbar type optical switch which is widely used in optical add/drop modules for wavelength multiplex optical communication and the like.

2. Description of the Related Art

In an Optical Add/Drop module (hereinafter abbreviated as an "OADM") for high Dense Wavelength Division Multiplexing (hereinafter abbreviated as "DWDM") optical communication systems which has become widespread in recent years, a plurality of two input two output crossbar type optical switches are commonly used in accordance with the number of wavelength channels. FIG. 13 shows an example of the structure of the OADM for such DWDM communication systems. In FIG. 13, the reference symbol 1 denotes a wavelength demultiplexer (hereinafter abbreviated as DEMUX), while the reference symbol 2 denotes a wavelength multiplexer (MUX); and the OADM is constituted by the structure from this DEMUX 1 up to the MUX 2. And the reference symbol 3 denotes add ports while the reference symbol 4 denotes drop ports, and these ports are connected via optical switches 5.

In this OADM, the input light which has been wavelength division multiplexed is divided into light of various wavelengths by the DEMUX 1, and is inputted via optical path 7 to one of the input ports of each of the optical switches 5, while light which has been inputted from one of the add ports 3 is inputted to the other input port of each of the optical switches 5. The light which is inputted to these optical switches 5 is dispatched, by switching over their optical paths according to requirements, either to their drop ports 4 or to the MUX 2, and the light which is thus dispatched to this MUX 2 is wavelength division multiplexed and outputted.

The reference symbol 6 denotes Variable Optical Attenuators (hereinafter abbreviated as "VOA"s), one of which is inserted into each of the channels, with the objective of equalizing the light intensity between the channels. Accordingly, in the prior art type OADM shown in FIG. 13, a VOA 6 is connected to each output port for outputting from the optical switch 5 to the MUX 2. Many types of two input two output crossbar type optical switches and VOAs are on the market as individual optical components, and various ones thereof are also in use in OADMs.

FIG. 1 shows, the polymer thermo-optic digital optical switch, as one example of such an optical switch 5 of a two input two output crossbar type. This optical switch consists of an embedded polymer optical waveguide 11 on a silicon wafer and metal thin films of the surface of the waveguide 11. One example of the polymer waveguide material is polyimide. The mater thin films are made of nickel, aluminum, chrome, gold, nichrome or the and formed by a vapor deposition method, a spattering method, or the like. The electrode pads are also formed upon the surface of the optical waveguide 11. The core pattern of these optical waveguide 11 is that four Y branches are mutually opposed.

The metal thin films are arranged so as to be positioned above the respective Y branches at left and right sides thereof. Electrode pads for connection wiring are provided at both ends of each of these metal thin films, and are connected to electrode pins of a package case by gold wire bonding, so as to be connected to an external power source. When electric current comes to be flowed through these metal thin films by an external power source, they function as heaters due to the Joule heat which is generated in them at this time.

The refractive index of the polymer materials such as polyimide or the like which is used as the optical waveguide 11 decreases when the temperature of the materials increases. And light is propagated through the high refractive index area of this medium. Due to this, by heating up only one of the metal thin films which are provided upon the left and right sides of the Y branch, it is possible to direct the light to the side of the optical waveguide 11 that is not heated up.

In these metal thin film which thus function as heaters, the reference symbols 12a denote outer side heaters which are provided at the outer sides of the optical waveguide 11, while the reference symbols 12b denote inner side heaters which are provided at the inner sides of the optical waveguide 11. Accordingly, four of these outer side heaters 12a and four of the inner side heaters 12b are provided to the two input two output optical switch shown in FIG. 14.

FIG. 15 shows an example of a control method for optical path switching over of this two input two output crossbar optical switch. FIG. 15 shows the system in the cross state, in which, among the metal thin film heaters which are formed upon the waveguide, the four outer side heaters 12a are supplied with electrical power from a DC source 21 and are heated up. At this time, the light which is inputted from the input port 1 is outputted at the output port 2, while the light which is inputted from the input port 2 is outputted at the output port 1. On the other hand, the system can be switched over to the bar state by heating up the four inner side heaters 12b. At this time, the light which is inputted from the input port 1 is outputted at the output port 1, while the light which is inputted from the input port 2 is outputted at the output port 2.

FIG. 16 shows the way in which the connection wiring, after being brought together in common within the optical switch component, is connected to the DC source. By doing this, it is possible to provide the same function as the above described control method, while simplifying the external wiring. FIG. 16 shows the cross state, and, in the optical switch 5 in this figure as well, the reference symbols 12a denote the outer side heaters and the reference symbols 12b denote the inner side heaters, while the reference symbol 21 denotes the DC source.

Since one VOA is fitted to and used for each channel when this type of optical switch is used in an OADM, it has been attempted to integrate VOAs into such a two input two output crossbar type optical switch. As such a two input two output crossbar type optical switch integrated with VOAs, there may be cited as an example the one disclosed in Japanese Patent Application, First Publication No. 2002-196378 and due to the present inventors. In this optical switch, thermo-optic VOAs are integrated with a two input two output crossbar type optical switch which consists of four one input two output polymer thermo-optic digital optical switches opposed to one another.

However, with the optical switch disclosed in Japanese Patent Application, First Publication No. 2002-196378, a heater is provided for the VOAs, in addition to the eight heaters for the two input two output type crossbar optical switch, and due to this it is necessary to make the element larger, as compared to only a two input two output type crossbar optical switch. Furthermore, as shown in FIG. 14, in order to add a light output intensity variable attenuation function to the above described optical switch, it is also possible to extend the optical waveguide on the output port side, and to provide one additional heater 13. However, the element length of the two input two output optical switch becomes longer to this extent, and the element area also becomes greater.

Just as with a semiconductor product like a CPU or a DRAM, the cost of an optical switching element is greatly influenced by how many elements can be made from a single silicon wafer. Accordingly, the two input two output optical switch of this type which is endowed with a light output intensity variable attenuation function and which incorporates nine heaters has a higher cost in proportion to its increase in length. Furthermore, in a macromolecular optical waveguide in which a certain amount of propagation loss is caused by material characteristics, add to increase of element cost and of module size entailed as described above, the problem arises that it is not possible to ignore the increase in insertion loss due to increase in the length of the optical path.

In the case of a Silica Planer Lightwave Circuit (hereinafter abbreviated as PLC) devices, for example, the propagation loss of embedded waveguide is about 0.02 dB/cm, so that increase of this order of the length of the optical path will not present a problem. However, in case of usual polymer PLC devices, the propagation loss is larger than 0.1 dB/cm. For example, the propagation loss of fluorinated polyimide PLC devices is about 0.6 dB/cm at 1550 nm band. So that the increase of the propagation loss causes by a few millimeters increase of the length of the element is not negligible for polymer PLC devices.

SUMMARY OF THE INVENTION

The present invention has been conceived in the light of these considerations, and its objective is to provide a low cost optical switch which has excellent operability and low insertion loss.

In order to solve the above described problems, the present invention provides a two input two output type optical switch comprising four one input two output type optical switches which are arranged to oppose one another, each such one input two output type optical switch comprising a Y branch portion in which one optical waveguide is branched into two optical waveguides, wherein: two refractive index adjustment means are provided in the vicinity of each Y branch portion; switching over of the optical path is performed by half of the refractive index adjustment means functioning alternately; and a light output intensity variable attenuation function which attenuates by any desired amount the intensity of the light which is being outputted is implemented, at some input port and/or output port, by operating at least one of the refractive index adjustment means which is not currently being used for switching over of the optical path.

According to this optical switch, it is possible to implement the light output intensity variable attenuation function without newly providing any additional refractive index adjustment means, and accordingly the area of the optical switch element is not increased and its cost is not raised, and furthermore it is possible to implement an optical switch which has a low insertion loss at a low cost, since there is no increase of insertion loss due to increase of the length of the optical path.

In this optical switch, it is preferable that each of the refractive index adjustment means comprises at least a conductive thin film and an electrical power source, and adjusts the refractive index of its optical waveguide by applying a voltage to the conductive thin film and adjusting the amount of supplied electrical power or the applied voltage. By using this refractive index adjustment means which is made up from the conductive thin film and the electrical power source, and by adjusting the amount of supplied electrical power or the applied voltage, it is possible to control the refractive index easily. Moreover, the construction is simple, and this device is easy to manufacture.

Furthermore, in this optical switch, it is preferable that at least the one of these conductive thin films which is positioned in the vicinity of the input port or the output port which is endowed with the light output intensity variable attenuation function is wired independently of the other conductive thin films, so as to enable the power supplied to it or the voltage applied to it to be adjusted. By doing this, it becomes possible to implement an optical switch which has excellent operability.

heat generating material Furthermore, in this optical switch, it is preferable that connection wiring for connecting together the conductive thin film which is positioned in the vicinity of the input port or the output port which is not endowed with the light output intensity variable attenuation function and the power source can be classified into these three types of terminal: terminals for implementing the cross state; terminals for implementing the bar state; and common terminals for ground. By doing this, the structure of the connection wiring for connecting the conductive thin film to the power source becomes simple, and accordingly it becomes easy to provide this connection wiring.

Furthermore, in this optical switch, it is preferable that the conductive thin film is a metal thin film. It is possible to utilize a cheap material such as nickel or aluminum for such metal thin film, and therefore, it can be manufactured by a simple and convenient method such as a vapor deposition method or a sputtering method.

Furthermore, in this optical switch, it is preferable that each of the refractive index adjustment means is a heater, and switching over of the optical path is performed by adjusting the amount of heating up of these heaters, thus taking advantage of the thermo-optic effect. Adjustment of the amount of heating of the heaters can be performed precisely, simply and conveniently, and therefore it becomes possible to switch over the optical path with good accuracy.

Furthermore, in this optical switch, each of the refractive index adjustment means may be an electrode which generates an electric field, and switching over of the optical path may be performed by adjusting the strengths of the electric fields due to the electrodes, thus taking advantage of the electro-optic effect. By doing this, it becomes possible to implement an optical switch whose response time is quick, and moreover which can be operated while requiring almost no consumption of electrical power.

Furthermore, in this optical switch, each of the refractive index adjustment means may be an electrode which generates an electric field and at least one portion of each of the optical waveguides may be made from a liquid crystal, and switching over of the optical path may be performed by adjusting the strengths of the electric fields due to the electrodes, thus controlling the orientation state of the liquid crystals. By doing this, it becomes possible to implement an optical switch which can be operated with low electrical power consumption.

The present invention also provides an OADM, comprising a plurality of optical switches as described above, and at least one input port of each of the optical switches being connected to a DEMUX, the other input port being connected to an add port, at least one output port of each of the optical switches being connected to a MUX, and the other output port being connected to a drop port; and wherein switching over of the optical paths of the optical switches is performed by performing switching over between the add/drop operational state and the through operational state, and light intensity equalization is performed by the light output intensity variable attenuation function for each channel. By doing this, it becomes possible to implement an OADM which can equalize the intensity of the output light beams without connecting up any discrete VOA provided independently for each channel.

Furthermore, the present invention also provides an optical communication system, characterized in that it performs wavelength division multiplexing optical communication using an OADM as described above. According to this system, since the light intensities for the various wavelengths which have been wavelength multiplexed are equalized and the light intensities of the light beams which are incident from the add ports are also equalized, it becomes possible to implement an optical communication system which can perform DWDM optical communication with high reliability.

DETAILED DESCRIPTION OF THE PREFERRED EMBODIMENTS

In the following, various preferred embodiments of the present invention will be explained with reference to the figures.

FIRST EMBODIMENT

—THE OPTICAL SWITCH—

Figure 1:
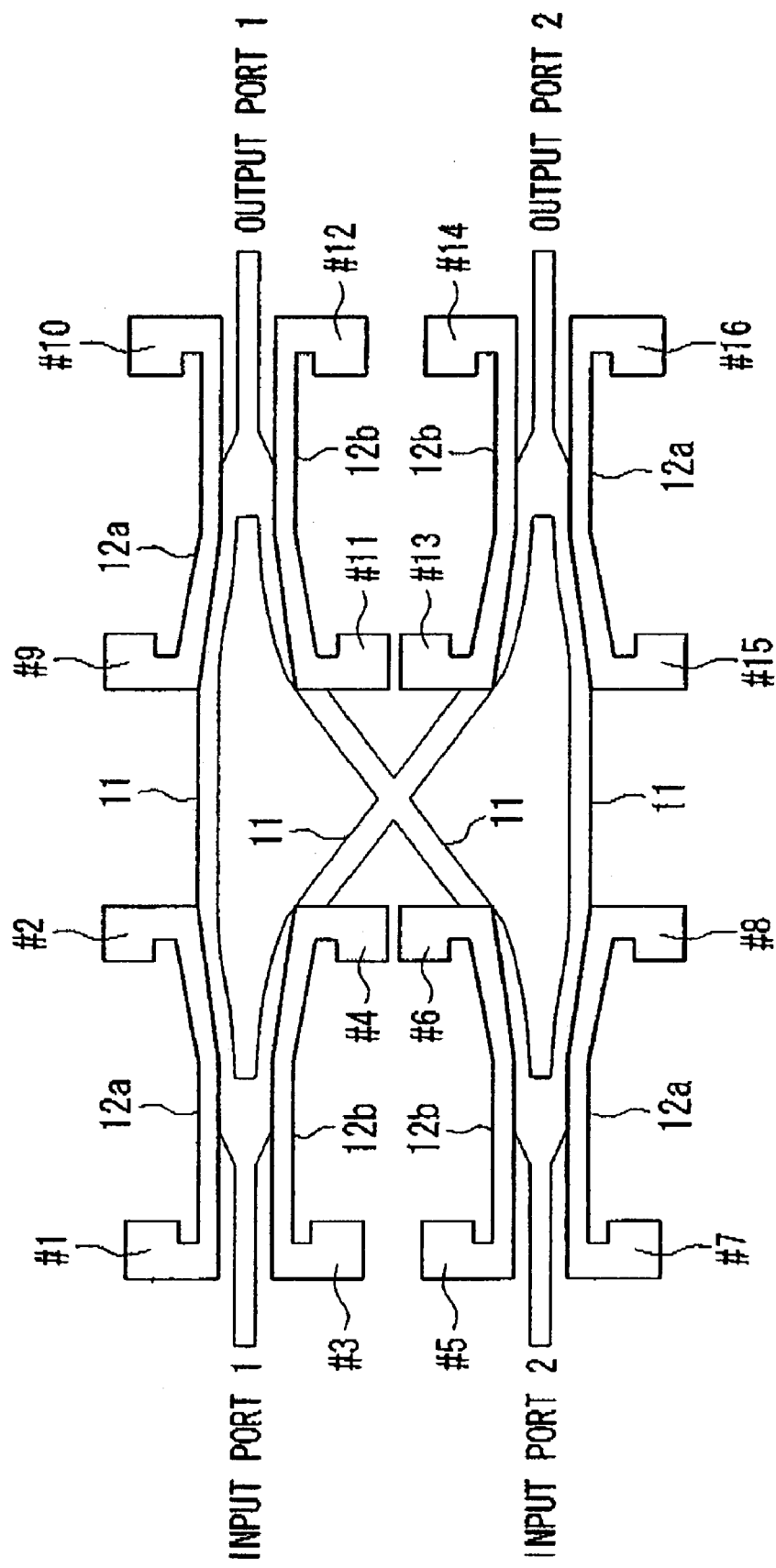
FIG. 1 is a schematic view showing the structure of a two input two output Y branch type optical switch according to the first embodiment of the present invention.

FIG. 1 shows a two input two output crossbar optical switch of the first embodiment. Four optical waveguide 11 of single input two output Y branch type core pattern are opposed to one another, and metal thin film heaters 12a and 12b are respectively arranged upon the outer and inner sides of the Y branch portions of each of these optical waveguide 11. The optical waveguide 11 are formed upon a silicon wafer, and are made from polymer materials such as a polyimide or the like. These polymer materials such as a polyimide or the like exhibit the thermo-optic effect, which is the characteristic that when the temperature of these materials increase their refractive index decrease. This first embodiment provides an optical switch which takes advantage of this thermo-optic effect, and which performs switching over of the optical path and also implements a light output intensity variable attenuation function by heating up the Y branch portions of the optical waveguide 11 with the metal thin film heaters 12a and 12b, thereby changing the refractive indices in the outer sides and the inner sides of the Y branch portions.

The metal thin film heaters 12a and 12b are made from thin films of a metal such as nickel, aluminum, chrome, gold, nichrome or the like, by a vapor deposition method, a sputtering method, or the like. An electrode pad for connection wiring is provided at each end of each of these metal thin films, and these are wired to electrode pins of a package case by gold wire bonding, so as to be connected to an external power ssource. Joule heat can be generated by flowing electric current through these metal thin films from the external power source, and thereby they function as heaters. Furthermore, it is possible to control the amount of heating up by adjusting the amount of electrical power which is supplied from the external power source.

As shown in FIG. 1, two of these metal thin film heaters 12a and 12b are provided for each one of the Y branch portions, so that eight in all are provided to a single one of these optical switches. In these metal thin film heaters 12a and 12b, the ones which are positioned at the outer sides of each branch portion will be termed the outer side heaters, and they are designated in the figure by the reference symbols 12a. Furthermore, those metal thin film heaters which are positioned at the inner sides of each branch portion will be termed the inner side heaters, and they are designated in the figure by the reference symbols 12b.

The electrode pads are provided to both the ends of each of the outer side heaters 12a and the inner side heaters 12b. In detail, electrode pads designated as #1 and #2 are provided to the two ends of the outer side heater 12a which is provided to the Y branch portion on the side of an input port 1, while electrode pads designated as #3 and #4 are provided to the two ends of the inner side heater 12b of said Y branch portion. Furthermore, electrode pads designated as #5 and #6 are provided to the two ends of the inner side heater 12b which is provided to the Y branch portion on the side of an input port 2, while electrode pads designated as #7 and #8 are provided to the two ends of the outer side heater 12a of said Y branch portion.

In the same manner, electrode pads designated as #9 and #10 are provided to the two ends of the outer side heater 12a which is provided to the Y branch portion on the side of an output port 1, while electrode pads designated as #11 and #12 are provided to the two ends of the inner side heater 12b of said Y branch portion. Furthermore, electrode pads designated as #13 and #14 are provided to the two ends of the inner side heater 12b which is provided to the Y branch portion on the side of an output port 2, while electrode pads designated as #15 and #16 are provided to the two ends of the outer side heater 12a of said Y branch portion.

Figure 3:
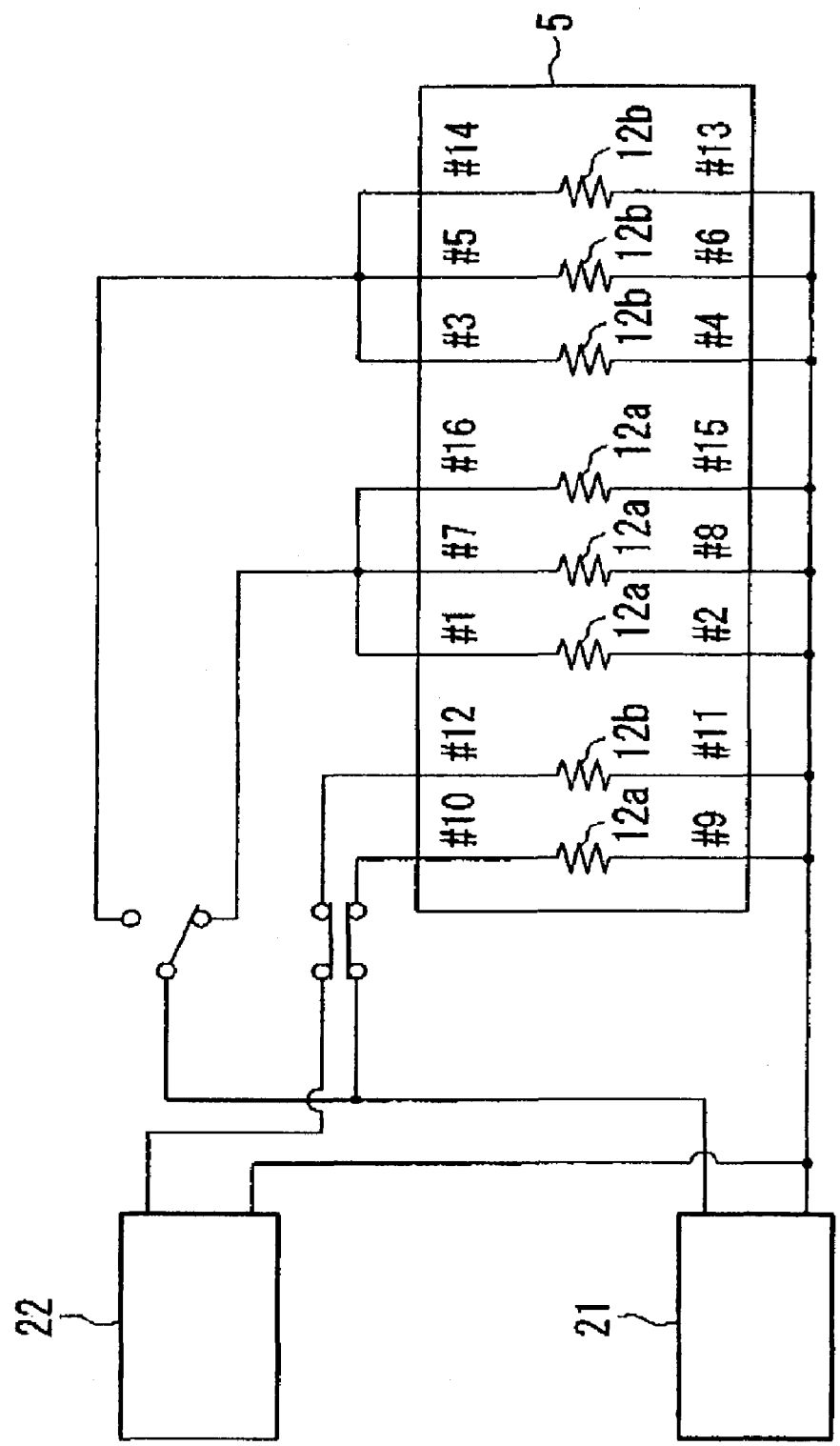
FIG. 3 is a schematic view showing the heater control in the cross state for this optical switch according to the first embodiment of the present invention.
Figure 4:
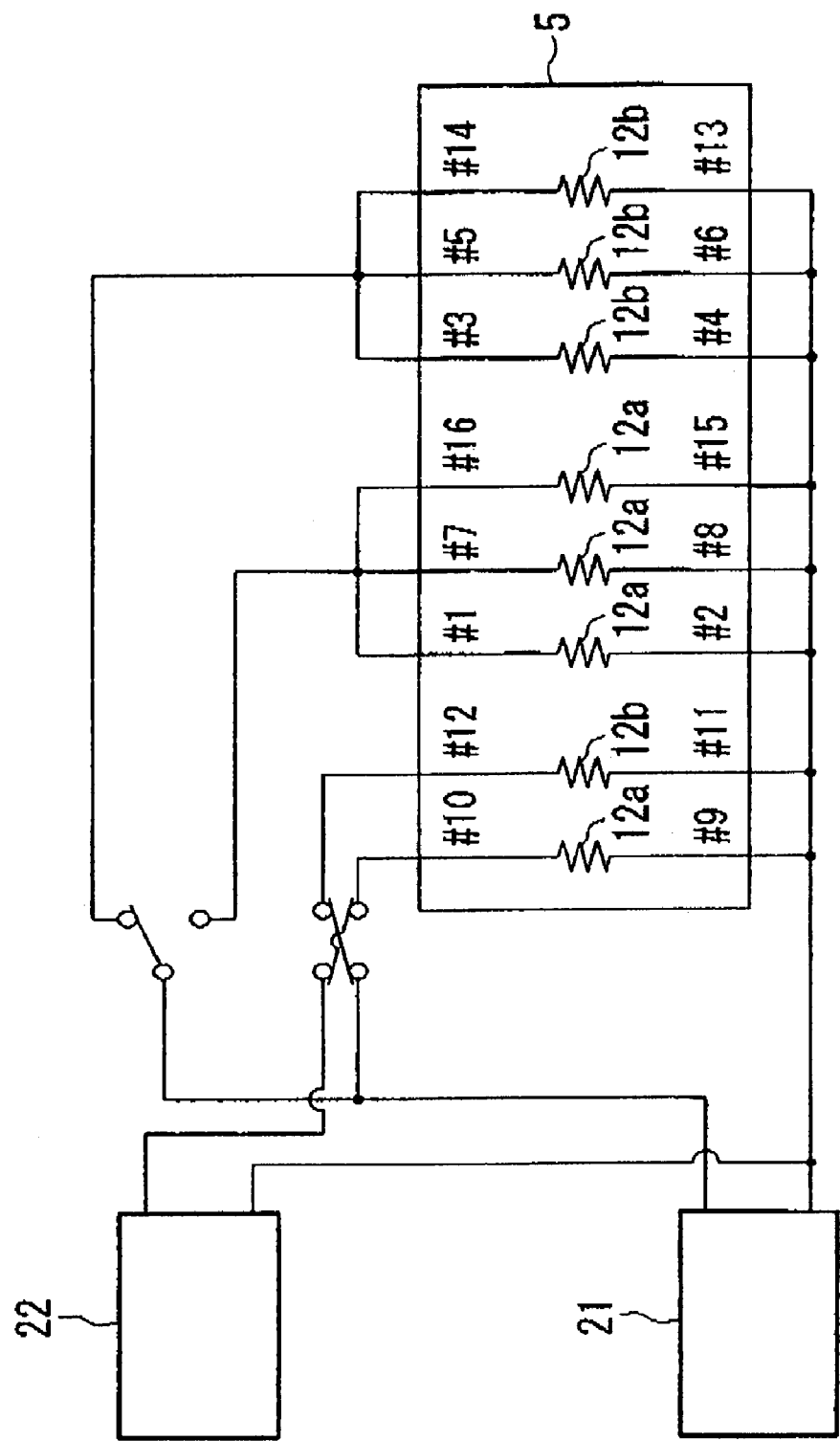
FIG. 4 is a schematic view showing the heater control in the bar state for this optical switch according to the first embodiment of the present invention.

FIGS. 3 and 4 are schematic figures showing the control method for the optical switch of this first embodiment. With the optical switch in FIG. 3, the reference symbol 21 denotes a constant voltage DC source, which serves as a power source for performing switching over of the optical path. And the reference symbol 22 denotes a variable voltage DC source, which serves as a power source for implementing the light attenuation function.

Switching over of the optical path is performed by heating up one or the other of the outer side and the inner side of the Y branch portion of each of the input ports and the output ports, and, by thus reducing the refractive index of the side which is thus heated up, directing the light to the side which is not thus heated up (i.e., to the side whose refractive index remains high).

The outer side heater 12a on the input port 1 side (the heater which has the electrode pads #1 and #2), the outer side heater 12a on the input port 2 side (the heater which has the electrode pads #7 and #8), and the outer side heater 12a on the output port 2 side (the heater which has the electrode pads #15 and #16), are connected together in parallel by their lead wires, and electric current may be supplied to them by switching over the connecting wires (as shown in FIG. 3) so that they are connected to the constant voltage DC source 21.

In the same manner, the inner side heater 12b on the input port 1 side (the heater which has the electrode pads #3 and #4), the inner side heater 12b on the input port 2 side (the heater which has the electrode pads #5 and #6), and the inner side heater 12b on the output port 2 side (the heater which has the electrode pads #13 and #14), are connected together in parallel by their lead wires, and electric current may be supplied to them by switching over the connecting wires (as shown in FIG. 4) so that they are connected to the constant voltage DC source 21.

By the above described switching over of the connecting wiring, electric current is flowed either to the outer side heaters 12a or to the inner side heaters 12b on the sides of the three ports other than the output port 1 side (i.e. on the sides of the input port 1, the input port 2, and the output port 2), and thereby the outer sides or the inner sides of the corresponding Y branch portions are heated up, which implements switching over of the optical path.

Next, the mechanism for light attenuation is implemented by heating up both the outer side and the inner side of one of the Y branch portions by the corresponding metal thin film heaters, and by changing the refractive indices of both the outer side and the inner side of this Y branch portion while adjusting the amount of heating up, so that a portion of the light which passes through is emitted from the optical waveguide 11 to the exterior as leakage light. In this first embodiment of the present invention, this light attenuation mechanism is equipped to the output port 1 shown in FIG. 1.

Thus, as shown in FIGS. 3 and 4, by switching over the connection wiring, one or the other side heater 12a on the side of this output port 1 (the heater which has the electrode pads #9 and #10), and the inner side heater 12b on this output port 1 side (the heater which has the electrode pads #11 and #12), is connected to the variable voltage DC source 22, while furthermore the other one is connected to the constant voltage DC source 21, and in this manner electric current is supplied to both of them. In other words, either the outer side heater 12a or the inner side heater 12b on the output port 1 side is connected to the variable voltage DC source 22, independently of the other ones of the metal thin film heaters 12a and 12b. Due to this, it is possible to control the amount of heating up of the outer side heater 12a or of the inner side heater 12b on the output port 1 side by adjusting the amount of electrical power supplied by the variable voltage DC source 22, and this implements a light attenuation mechanism which functions upon the output port 1.

Figure 2A:
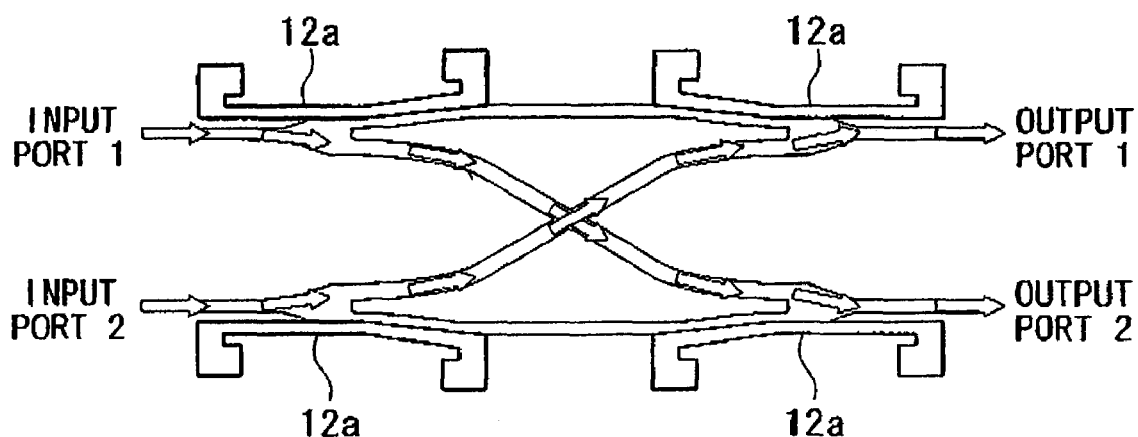
FIG. 2A is a schematic view showing the optical path of this first embodiment in the cross state.
Figure 2B:
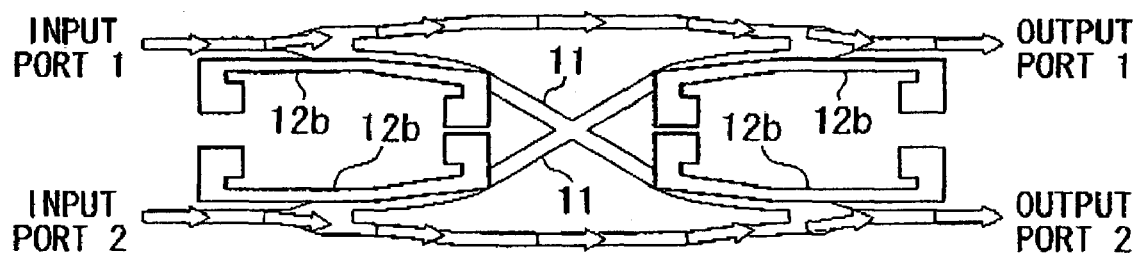
FIG. 2B is a schematic view showing the optical path of this first embodiment in the bar state.

FIGS. 2A and 2B show the way in which the optical paths are switched over by this optical switch of this first embodiment of the present invention. In the figure, the light paths are indicated by arrows. As shown in FIGS. 2A and 2B, there are two types of such optical paths. In one of them, as shown in FIG. 2A, the situation is that the light which has been inputted from the input port 1 is outputted to the output port 2, while the light which has been inputted from the input port 2 is outputted to the output port 1, and this is termed "cross state". In the other, as shown in FIG. 2B, the situation is that the light which has been inputted from the input port 1 is outputted to the output port 1, while the light which has been inputted from the input port 2 is outputted to the output port 2, and this is termed "bar state". The manner in which this cross state and bar state are controlled is shown below.

FIG. 3 shows the electrical power supply to the metal thin film heaters in the cross state. In the cross state, the four outer side heaters 12a are connected to the constant voltage DC source 21. Furthermore, among the four inner side heaters 12b, the inner side heater 12b on the output port 1 side (that heater which has the electrode pads #11 and #12) is connected to the variable voltage DC source 22. The other ones of the inner side heaters 12b are not connected to any power source.

In this cross state, the four outer side heaters 12a are all heated up by the constant voltage DC source 21, so that the refractive indices of the optical waveguide 11 in the vicinities of these outer side heaters 12a are reduced by this heating up. Among the four inner side heaters 12b, all those except for the inner side heater 12b on the output port I side are not heated up, so that the optical waveguide 11 are not heated up in the vicinities of these three inner side heaters 12b. As a result, only the sides which are not heated up have a refractive index distribution suitable for conducting light, and thus switching over of the optical paths is performed as shown in FIG. 2A.

The light output intensity variable attenuation function for the output port 1 during this cross state will now be explained. The inner side heater 12b which is provided on the side of this output port 1 (the heater which has the electrode pads #11 and #12) is connected to the variable voltage DC source 22. By adjusting the amount of electrical power supplied by this variable voltage DC source 22 and thus controlling the amount by which this heating up is performed, reduction of the refractive index of the optical waveguide upon the side on which light is to be conducted as well is caused according to the amount of this heating up, and thereby the amount of light which leaks out in the vicinity of this Y branch portion increases, and consequently, the light output intensity variable attenuation function is implemented for the output port 1.

FIG. 4 shows the electrical power supply to the metal thin film heaters in the bar state. In the bar state, the four inner side heaters 12b are connected to the constant voltage DC source 21. Furthermore, among the four outer side heaters 12a, the outer side heater 12a on the output port 1 side (that heater which has the electrode pads #9 and #10) is connected to the variable voltage DC source 22. The other ones of the outer side heaters 12a are not connected to any power source.

In this bar state, the four inner side heaters 12b are all heated up by the constant voltage DC source 21, so that the refractive indices of the optical waveguide 11 in the vicinities of these inner side heaters 12b are reduced by this heating up. Among the four outer side heaters 12a, all those except for the outer side heater 12a on the output port 1 side are not heated up, so that the optical waveguide 11 are not heated up in the vicinities of these three outer side heaters 12a. As a result, only the side which is not heated up has a refractive index distribution suitable for conducting light, and thus switching over of the optical paths is performed as shown in FIG. 2B.

The light output intensity variable attenuation function for the output port 1 during this bar state will now be explained. The outer side heater 12a which is provided on the side of this output port 1 (the heater which has the electrode pads #9 and #10) is connected to the variable voltage DC source 22. By adjusting the amount of electrical power supply by this variable voltage DC source 22 and thus controlling the amount by which this heating up is performed, reduction of the refractive index of the optical waveguide upon the side on which light is to be conducted as well is caused according to the amount of this heating up, and thereby the amount of light which leaks out in the vicinity of the Y branch portion increases, and consequently, the light output intensity variable attenuation function is implemented for the output port 1.

In the case of either FIG. 3 or FIG. 4 explained above, the connection wiring for connecting those ones among the metal thin film heaters which are positioned in the vicinity of the input ports and in the vicinity of that output port which does not have any light output intensity variable attenuation function, and the power source, may be classified into the following three types of terminal: terminals for implementing the cross state; terminals for implementing the bar state; and common terminals for ground.

Figure 5:
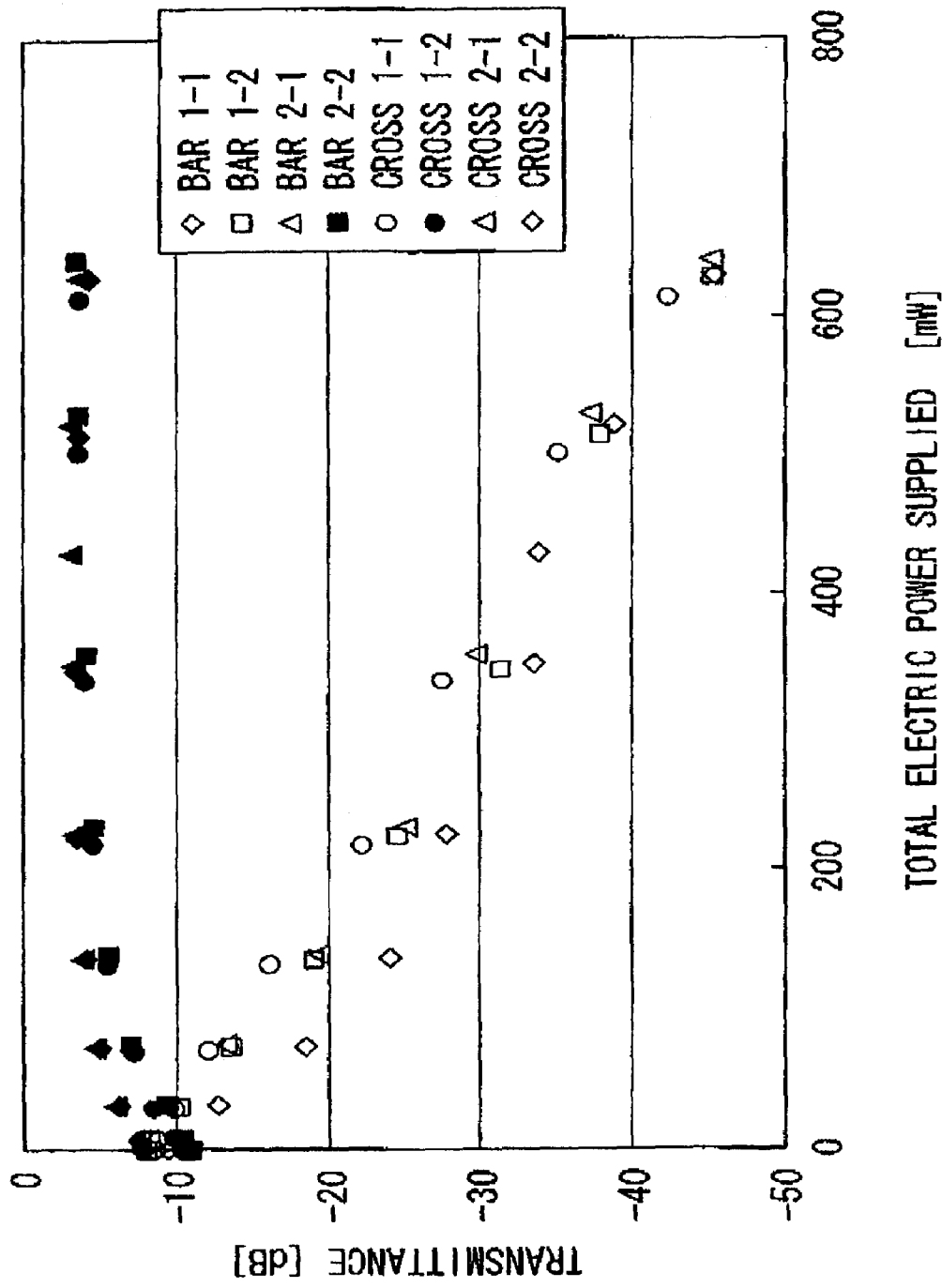
FIG. 5 is a figure showing the light transmittance of each optical path with respect to the total electric power supplied to the heaters of this optical switch according to the first embodiment.

FIG. 5 shows, among the optical characteristics of the optical switch according to this first embodiment, the insertion loss due to switching over of the optical paths. This optical characteristic is the relationship between the light transmission amount for each path and the amount of electrical power which is supplied from the constant voltage DC source 21, both for when the optical path is set to the bar state as shown in FIG. 2B, and for when it is set to the cross state as shown in FIG. 2A. It should be understood that this relationship is measured in the state in which the variable voltage DC source 22 is deactivated so that the light attenuation mechanism for the output port 1 is not being employed.

As for the light transmittance when the optical path is set to the bar state, in FIG. 5, the symbol designated as "bar 1-1" shows the amount of transmittance from the input port 1 to the output port 1, the symbol designated as "bar 1-2" shows the transmittance from the input port 1 to the output port 2, the symbol designated as "bar 2-1" shows the transmittance from the input port 2 to the output port 1, and the symbol designated as "bar 2-2" shows the transmittance from the input port 2 to the output port 2.

Furthermore, as for the light transmittance when the optical path is set to the cross state, in FIG. 5, the symbol designated as "cross 1-1" shows the transmittance from the input port 1 to the output port 1, the symbol designated as "cross 1-2" shows the transmittance from the input port 1 to the output port 2, the symbol designated as "cross 2-1" shows the transmittance from the input port 2 to the output port 1, and the symbol designated as "cross 2-2" shows the transmittance from the input port 2 to the output port 2.

In FIG. 5, the plots in solid black show the transmittance of optical paths in which light is supposed to be transmitted, while the white plots outlined in black show the transmittance of the optical paths in which light is supposed not to be transmitted. As shown in FIG. 5, the extinction ratio of the optical switch of this first embodiment increases as the amount of electrical power supplied is increased. The optical characteristics of 3 dB insertion loss and 40 dB extinction ratio are attained when total amount of electrical power which is supplied to the four heaters reaches 600 mW.

Figure 6:
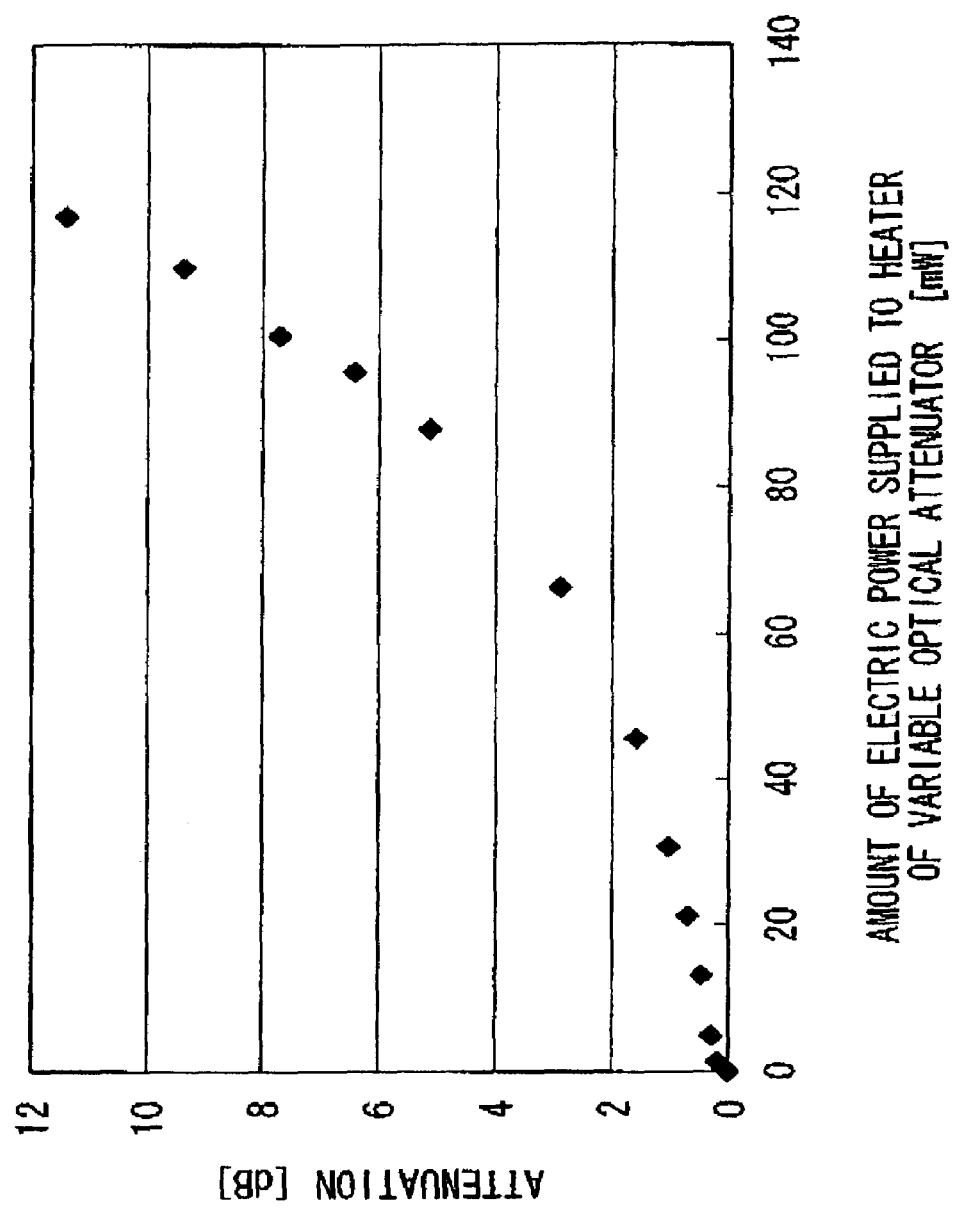
FIG. 6 is a figure showing, for the optical switch of the first embodiment, the relationship of the light attenuation amount with respect to the amount of electrical power supplied to the heater which implements the light output intensity variable attenuation function.

FIG. 6 shows, among the optical characteristics of the optical switch according to this first embodiment, the attenuation of the light intensity due to the light output intensity variable attenuation function. This optical characteristic gives the relationship, when the connection wiring is connected as shown in FIG. 3 and the optical path is set to the cross state so that the inner side heater on the side of the output port 1 (the heater which has the electrode pads #11 and #12) is connected to the variable voltage DC source 22, between the attenuation of the light intensity at the output port 1 and the amount of electrical power which is supplied to that inner side heater on the side of the output port 1. With the optical switch according to this first embodiment of the present invention, as shown in FIG. 6, it is possible to obtain an attenuation of 10 dB or greater.

Since the required dynamic range of attenuation is about 10 dB for light intensity equalization in order to amplify light using erbium doped optical fiber optical amplifiers, it will be understood that this optical switch according to the first embodiment of the present invention provides sufficient effectiveness for this purpose, as shown in FIG. 6. It should be noted that the same result is obtained when the connection wiring is connected as shown in FIG. 4, so that the outer side heater on the output port 1 side (the heater which has the electrode pads #9 and #10) is connected to the variable voltage DC source 22, and the optical path is set to the bar state.

With the optical switch according to this first embodiment, it is possible to set the optical path to the cross state or to the bar state by heating up either the outer side heaters 12a or the inner side heaters 12b among the metal thin film heaters which are provided in the vicinity of the Y branch portions. And, due to this, it is possible to perform switching over of the optical path by changing over the heaters which are heated up.

Furthermore, it is possible to perform the light output intensity variable attenuation function by heating up at least one among those metal thin film heaters which are not heated up for this switching over of the optical path, while adjusting the amount of such heating. By doing this, it is possible to implement the light output intensity variable attenuation function without newly providing any additional heater, so that there is no increase in the cost of the component due to increase in the optical switching element area, and furthermore it is possible to implement an optical switch which has a low insertion loss, since there is no increase of insertion loss due to increase in the length of the optical path.

Furthermore it is possible to implement an optical switch of superior operability, by connecting the at least one metal thin film heater which is positioned in the vicinity of the output port and which has the light output intensity variable attenuation function independently from the other ones of the metal thin film heaters, so as to make it possible to adjust the amount of electrical power supplied thereto, or the voltage which is applied.

It should be noted that, when adjusting the refractive index by taking advantage of the thermo-optic effect as with this first embodiment of the present invention, as the conductive thin film which constitutes the refractive index adjustment means, instead of the metal thin film utilized in this first embodiment, it would be possible to employ a thin oxide film made from ITO (indium tin oxide) or FTO (fluoro-substituted tin oxide) or the like, or a conductive polymer material or the like. Furthermore, as the refractive index adjustment means, other than the above described conductive thin film, it would be possible to utilize some other heat generating material connected to electrical power source such as a conductive wire like a nichrome wire, or the like. In the same manner as with the first embodiment of the present invention, it would be possible to flow electrical current from the power source through the refractive index adjustment means such as a conductive thin film or a conducting wire or the like, to generate Joule heat thereby, and thereby to cause the refractive index adjustment means to function as a heater, so as to switch over the optical path and so as to provide the light output intensity variable attenuation function.

Furthermore, although in the above described first embodiment, the power source which was used for providing the light output intensity variable attenuation function was a variable voltage DC source, it should not be considered as being limited thereto, and, provided that it is one which is able to adjust the amount of heating up of the metal thin film heater, it would also be acceptable for it to be, for example, a variable current electrical power source.

—THE OPTICAL ADD/DROP MODULE—

Next, the first embodiment of the OADM according to the present invention, which utilizes a plurality of the optical switches as described above will be explained. The OADM according to this first embodiment differs from the optical add/drop module according to the prior art which was shown in FIG. 13, in the point that no independent variable light attenuation devices 6 are required, but rather the optical switches 5 themselves are endowed with the light output intensity variable attenuation function. As described above, the optical switches 5 of this embodiment are provided with light attenuation mechanisms at their output ports 1, and they are capable of equalizing the intensity of the light beams which they output to the MUX 2.

Figure 13:
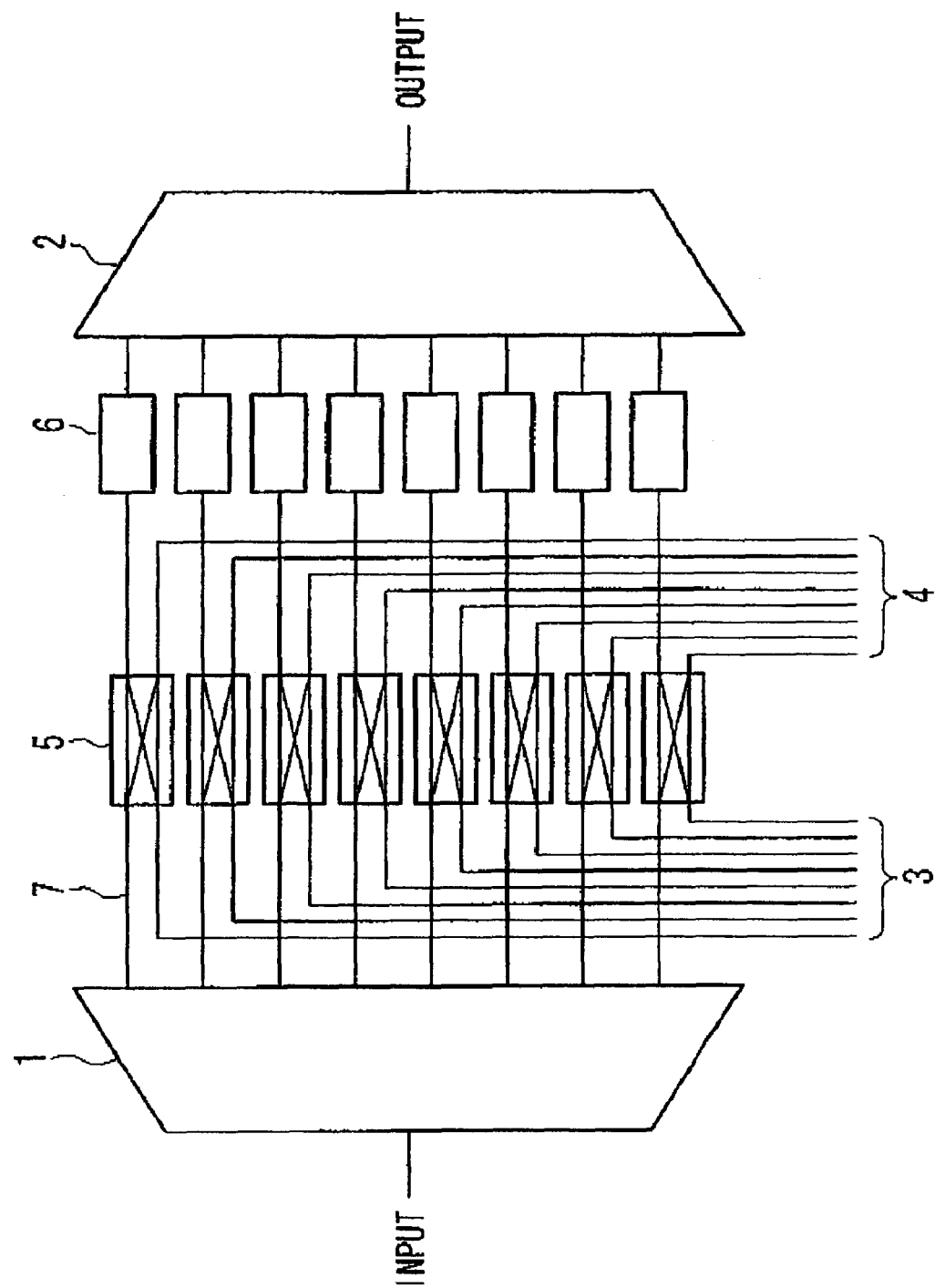
FIG. 13 is a schematic view showing an example of the structure of an OADM for use in DWDM optical communication according to the prior art.
Figure 14:
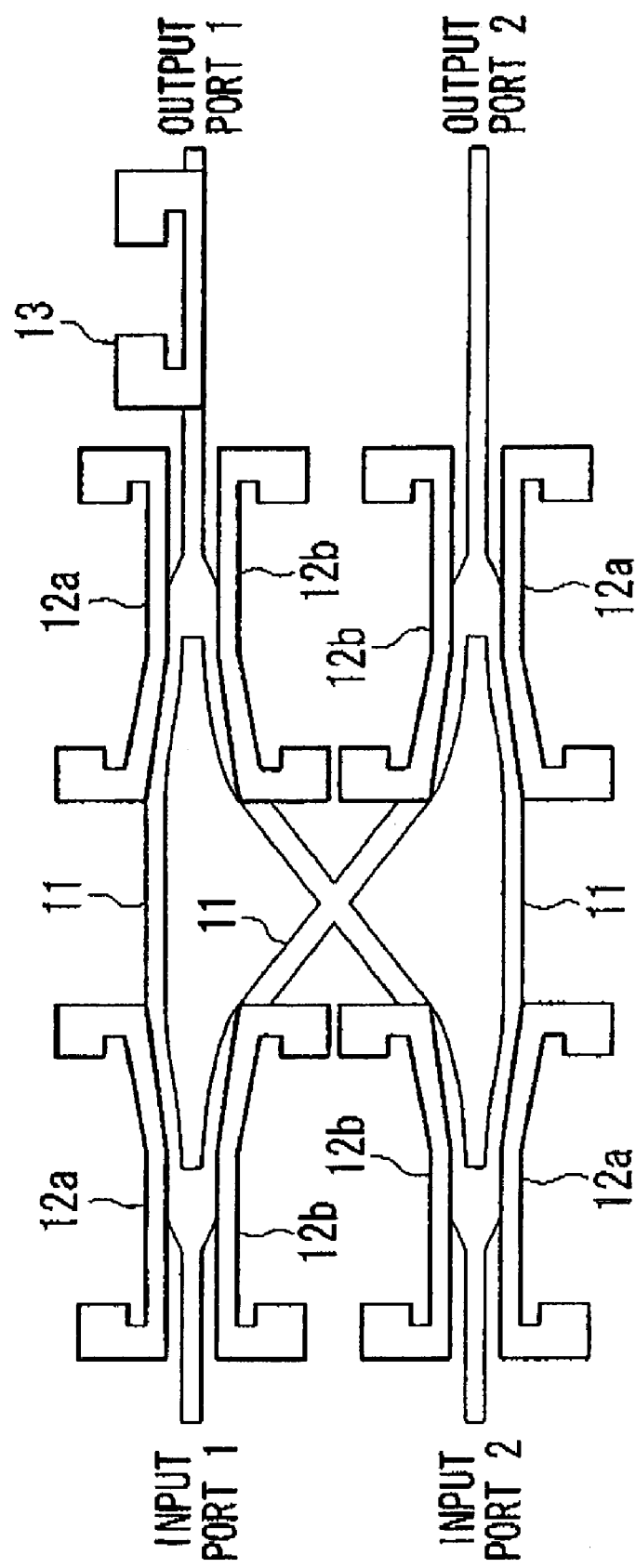
FIG. 14 is a figure showing, for a prior art optical switch, a structure for newly providing a heater thereto and endowing it with a light output intensity variable attenuation function.
Figure 15:
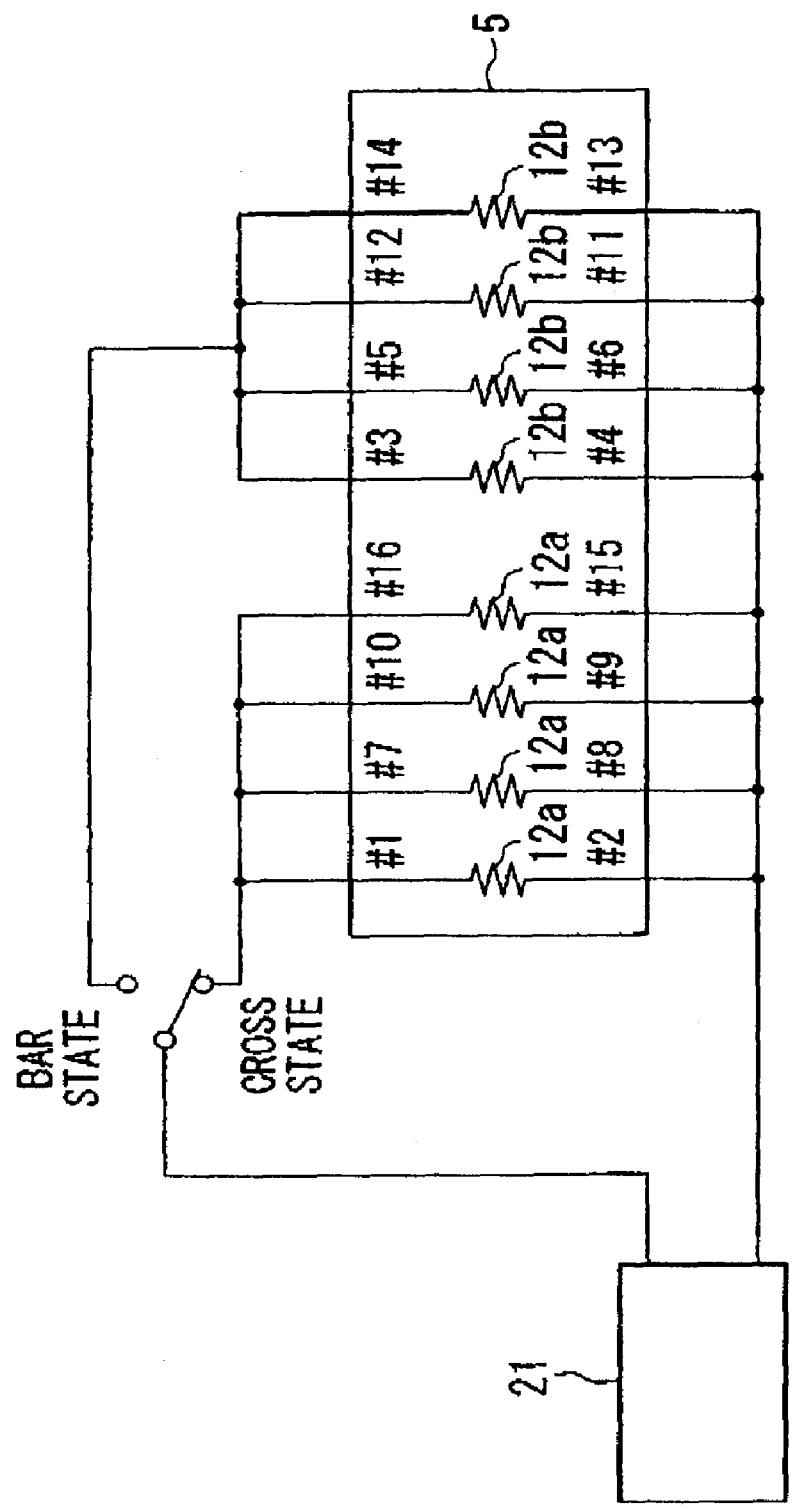
FIG. 15 is a schematic view showing, for a prior art optical switch, an example of the connection wiring in the cross state.
Figure 16:
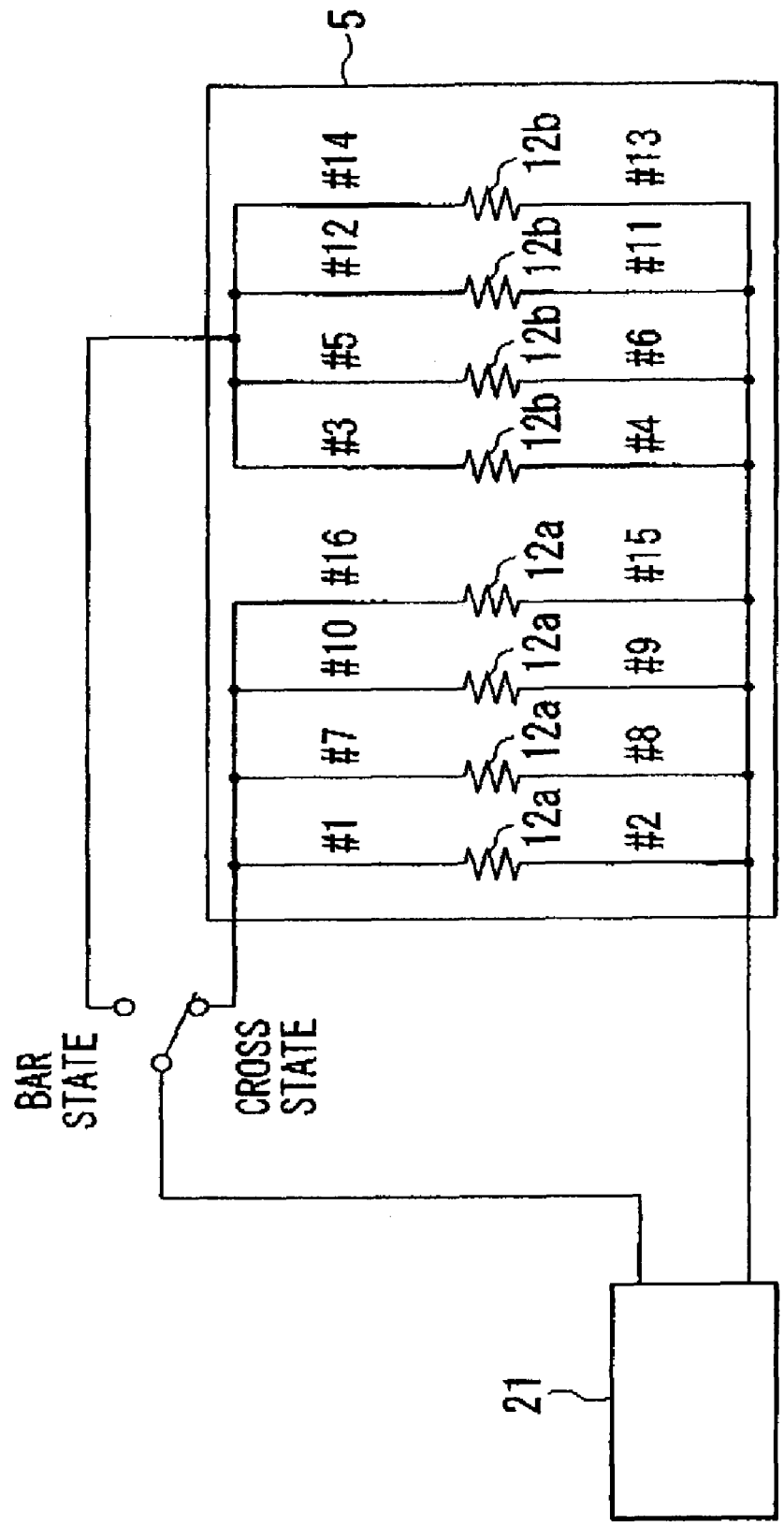
FIG. 16 is a schematic view showing, for a prior art optical switch, another example of the connection wiring in the cross state.

The structure, apart from the above described point in which it differs from the prior art, is the same as that of the OADM according to the prior art shown in FIG. 13. That is, the optical switches 5 according to the first embodiment as described above are set up by being arranged in the form of an array whose number of elements corresponds to the number of wavelength channels, and one of the input ports of each of the optical switches 5 is connected to the DEMUX 1, while its other input port is connected to one of the add ports 3. Furthermore, one of the output ports of each of the optical switches 5 is connected to the MUX 2, while its other output port is connected to one of the drop ports 4.

When the optical switches 5 are put into the cross state by appropriately controlling the states of heating up of their metal thin film heaters, then the light which is inputted from the DEMUX 1 is outputted to their drop ports 4, while the light which is inputted to their add port 3 is outputted to the MUX 2. That is, in this case, they function in the add/drop operational mode. On the other hand, when these optical switch 5 are put into the bar state, then the light which is inputted from the DEMUX 1 is outputted to the MUX 2, while the light which is inputted to their add ports 3 is outputted to their drop ports 4. That is, in this case, they function in the through operational mode.

It should be understood that the function which is called as light intensity equalization function here, is meant the same thing as the gain equalization which is performed by passive optical components such as a Fiber Bragg Grating (FBG) or a dielectric Thin Film Filter (TFF) in an Erbium Doped optical Fiber Amplifier (EDFA) module. These passive optical components are called gain equalizers (GEQ) or gain flattening filters (GFF), and they equalize the gain by applying loss to those wavelengths at which the gain is high. To put it in another way, in order to match all channels to the channel whose gain is the lowest, they attenuate the light beams upon the other channels. Here, the reason that the term "light intensity equalization" is used rather than "gain equalization" is because, when these optical switches of this embodiment are used, by changing the connections of the output ports of the optical switches, it is possible to equalize, not only the amplification gain differences of the optical signals which are amplified by the optical amplifiers, but also the intensities of the light beams which arrive from the add ports in the OADM.

—THE OPTICAL COMMUNICATION SYSTEM—

The first embodiment of the optical communication system according to another aspect of the present invention is built using the above described OADM. Since the light intensities are equalized for each wavelength of the wavelength division multiplexed signal light, and since the light intensities of the incident light beams from the add ports are also equalized, it becomes possible to perform DWDM communication at high reliability.

SECOND EMBODIMENT

—THE OPTICAL SWITCH—

The second embodiment of the present invention differs from the first embodiment described above at the point that the light output intensity variable attenuation function is provided to the output port 1 side and to the input port 2 side as well. Since the other structure of the optical switch element is the same as that of the optical switch element of the first embodiment shown by way of example in FIG. 1 and described above, detailed explanation thereof will be curtailed herein.

Figure 7:
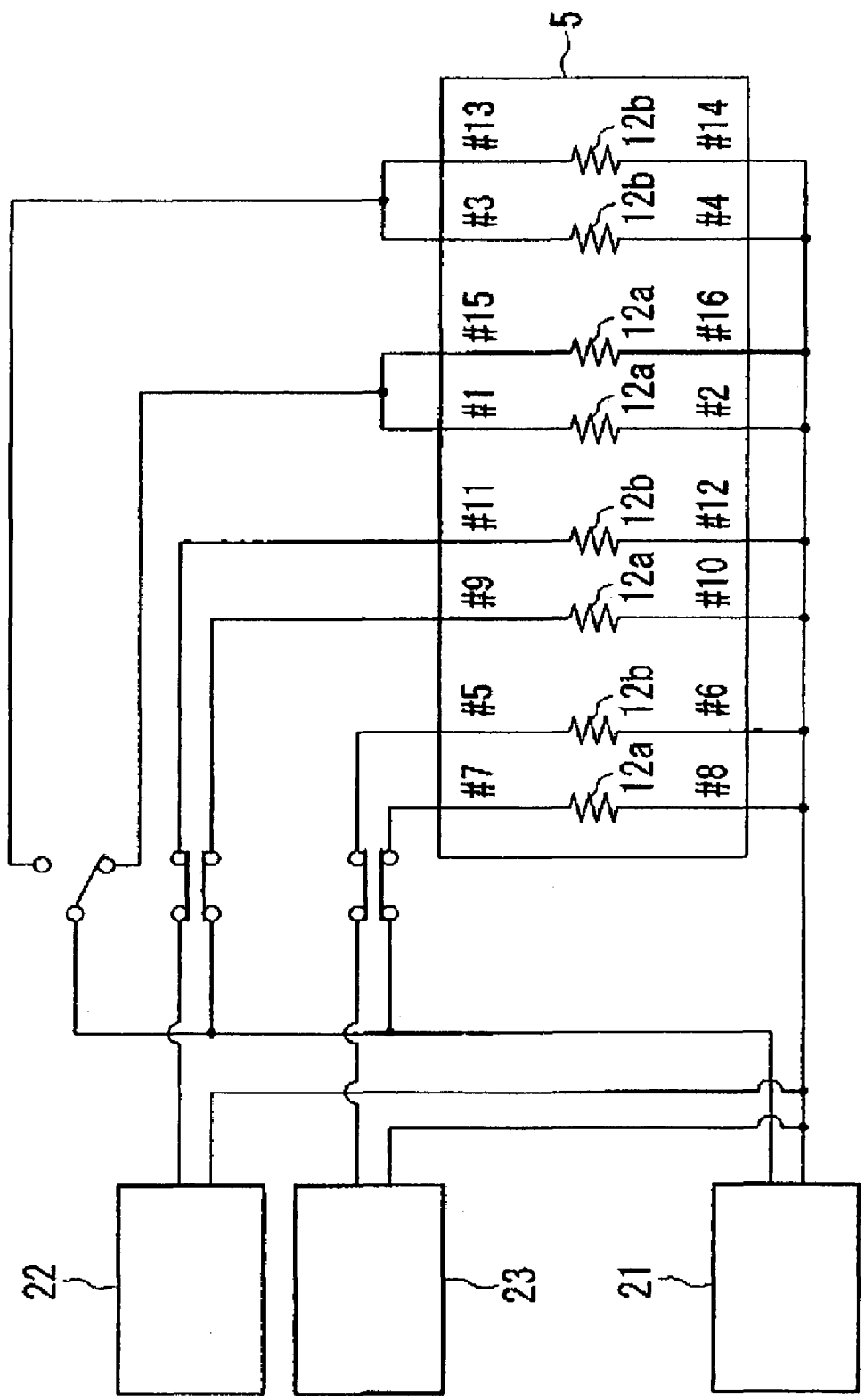
FIG. 7 is a schematic view showing, for the optical switch of the second embodiment, the heater control in the cross state.
Figure 8:
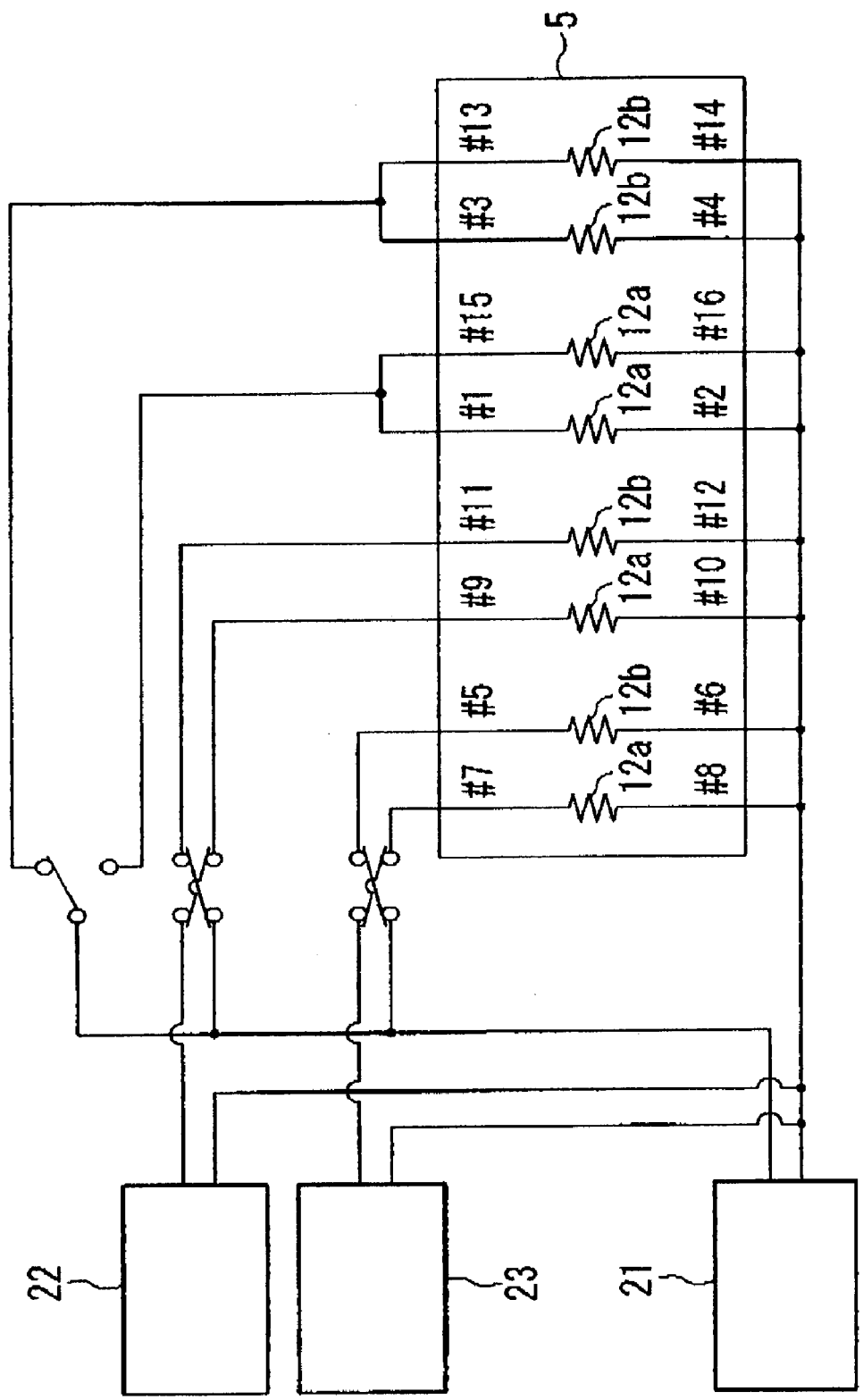
FIG. 8 is a schematic view showing, for the optical switch of the second embodiment, the heater control in the bar state.

FIGS. 7 and 8 show schematic views of the control method for the optical switch of this second embodiment. With the optical switch of this second embodiment, the connection wiring is provided and arranged so as to be able to connect the outer side heater (the heater which has the electrode pads #9 and #10) and the inner side heater (the heater which has the electrode pads #11 and #12) provided on the output port 1 side, which are endowed with a light output intensity variable attenuation function, to a variable voltage DC source 22 for the output port. Moreover, the connection wiring is also provided and arranged so as to be able to connect the outer side heater (the heater which has the electrode pads #7 and #8) and the inner side heater (the heater which has the electrode pads #5 and #6) provided on the input port 2 side, which are also endowed with a light output intensity variable attenuation function, to another variable voltage DC source 23 for the input port. By doing this, it becomes possible to adjust the amount of electrical power supplied for at least one of the metal thin film heaters which is positioned in the neighborhood of each of the output port 1 and the input port 2 independently of the other metal thin film heaters, so that it is possible thereby to provide the light output intensity variable attenuation function.

In the same way as with the first embodiment, for the switching over of the optical path, the optical path in the cross state is implemented by connecting the connection wiring as shown in FIG. 7. And the optical path in the bar state is implemented by connecting the connection wiring as shown in FIG. 8. The light output intensity variable attenuation function on the output port 1 side is implemented by controlling the amount of heating up by adjusting the voltage of the variable voltage DC source 22 for the output port, so as to cause reduction of the refractive index in the optical waveguide on the side of the output port 1 which is supposed to conduct light according to the amount of this heating up, thus increasing the amount of light which leaks out from the optical waveguide in the vicinity of the Y branch portion. And on the input port 2 side, in the same manner as on the output port 1 side, the light output intensity variable attenuation function is implemented by adjusting the voltage of the variable voltage DC source 23 for the input port, so as to cause reduction of the refractive index by controlling the amount of this heating up, thus increasing the amount of light which leaks out from the optical waveguide in the vicinity of the Y branch portion.

In this embodiment, it is possible to function the light attenuation mechanisms on the side of the output port 1 and on the side of the input port 2 to provide desired levels of light intensity attenuation independently of one another. Accordingly it is possible to double the dynamic range of attenuation of light intensity over which adjustment can be performed, as compared with an optical switch which has only one port which is endowed with a light output intensity variable attenuation function, as with the first embodiment of the present invention described above. Due to this, it is possible to perform equalization of the light intensity at high accuracy, even if the intensity of the light from the input port is relatively great.

THIRD EMBODIMENT

The third embodiment of the present invention differs from the second embodiment described above at the point that both the outer side heater (the heater which has the electrode pads #7 and #8) and the inner side heater (the heater which has the electrode pads #5 and #6) which are provided to the input port 2 side are constantly connected to the variable voltage DC source 23 for the input port. Since the other structures are the same as in the second embodiment shown and described above, detailed explanation thereof will be curtailed herein. With this third embodiment, it is possible to switch over the optical path while maintaining the supply of electrical current from the variable voltage DC source 23 for the input port to the metal thin film heater on the input port 2 side.

By doing this, it is possible to perform switching over of the optical path in the state in which the light intensity variable adjustment mechanism for the input port 2 side is functioning. Therefore, it is possible to set the desired value for attenuating the intensity of the light which is incident upon the input port 2, and to switch over the optical path from the bar state to the cross state, or from the cross state to the bar state, while maintaining the intensity of this light just as it is. Accordingly there is no change of the intensity of the light which is incident to the output port when switching over the optical path, so that it is possible for there to be no abrupt change of the intensity of the light which is outputted from the optical switch due to switching over of the optical path. After switching over the optical path, it is possible to adjust the intensity of the light which is outputted from the optical switch to the desired value by the light intensity variable attenuation function upon the input port 2 side and the output port 1 side.

If there is no light intensity variable attenuation function at the input port 2 side, or if the outer side heater and the inner side heater which are provided on the input port 2 side are normally not connected to the variable voltage DC source 23 for the input port, then for example, when switching over from the bar state to the cross state in the condition in which light of too much intensity is incident from the input port 2, this light of excessive intensity comes to be incident from the input port 2 to the output port 1. In order generally to bring the light intensity to the desired value, an optical power monitor is provided for detecting the intensity of the light which is propagated along the optical path, and the refractive index adjustment means is feedback controlled by this optical power monitor, whereby the light intensity is attenuated and brought to the desired value. In order to attenuate this light intensity and to bring it to the desired value, normally a time interval of a several milliseconds is required for the response of the feedback control and the refractive index adjustment means. Accordingly, when the light intensity is attenuated and brought to the desired value only at the output port 1 side, it takes a time period of several milliseconds until the light intensity is brought to the desired value, and during this interval light of an excessive intensity comes to be outputted from the output port 1. This phenomenon is undesirable since an excessive load comes imposed upon the device which is connected to the output port 1.

—THE OPTICAL ADD/DROP MODULE—

The OADM of this third embodiment of the present invention differs from that of the first embodiment described above at the point that it utilizes a plurality of optical switches of this third embodiment which have a light output intensity variable attenuation function at both their output port 1 sides and their input port 2 sides as described above. The input ports 1 of the optical switches are connected to the DEMUX 1, while the add ports are connected to their input ports 2. Furthermore, the output ports 1 of the optical switches are connected to the MUX 2, while the drop ports is connected to their output ports 2. -Since it is possible for the light attenuation function which attenuates the light intensity and brings it to the desired value to be made to function independently for each of the output port 1 side and the input port 2 side, the dynamic range can be made wider. Accordingly, even if the intensities of the light beams which are incident from the add ports upon the input port 2 are great, it is possible to perform equalization of these light beam intensities and to output them from the output port 1 to the MUX 2 at high accuracy.

Furthermore, with this optical switch according to the third embodiment of the present invention, when the optical path is to be switched over from the bar state to the cross state in the condition in which light of too much intensity is incident from the input port 2, it is possible to attenuate the intensity of the light which is incident at the input port 2 and to bring it to the desired value by using the light output intensity variable attenuation function of the input port 2, and to switch over the optical path while maintaining the intensity of this light just as it is. By switching over the optical path in this manner, it is ensured that light of too much intensity is never incident upon the output port 1. Accordingly, it never happens that light of an excessive intensity is incident upon any device such as the wavelength multiplex section or the like which is connected to this output port 1, so that it is possible to prevent imposition of an excessive load upon such a device.

FOURTH EMBODIMENT

Figure 9:
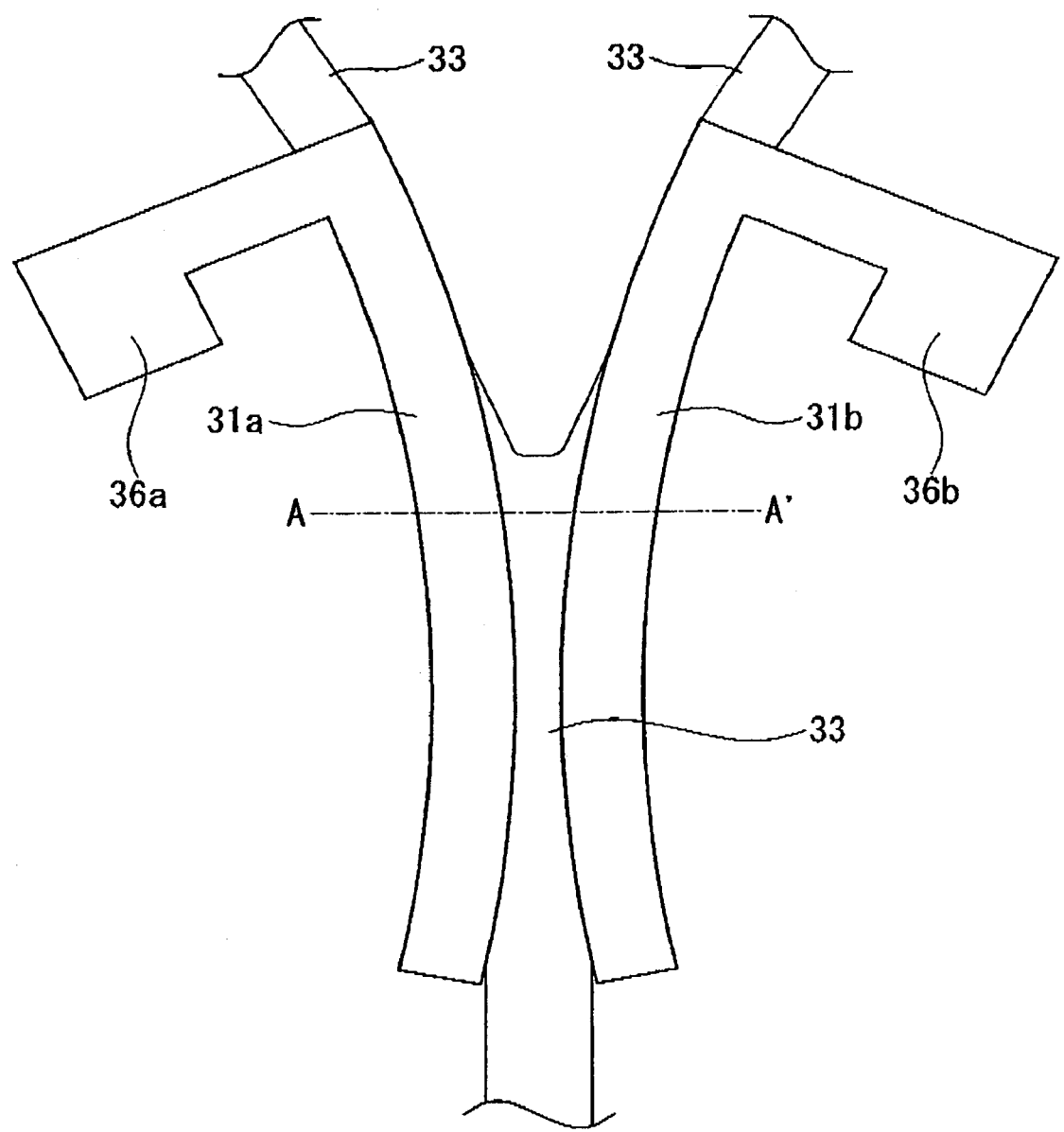
FIG. 9 is a schematic view showing an example of a Y branch portion of the optical switch of a fourth embodiment of the present invention.

The fourth embodiment of the present invention differs from the first embodiment described above at the point that, the optical waveguides which exhibit the electro-optic effect are employed instead of the optical waveguides which exhibit the thermo-optic effect, and which adjust their refractive indices by taking advantage of this electro-optic effect. Since the other structures are the same as in the first embodiment shown and described above, detailed explanation thereof will be curtailed herein. FIG. 9 shows an example of a Y branch portion of an optical switch which adjusts its refractive index by taking advantage of the electro-optic effect. By the electro-optic effect is meant the phenomenon that, when an electric field is applied to an optical medium, the refractive index of this medium changes. As for example disclosed in Japanese Patent Application, First Publication No. Hei 6-67232, such an optical waveguide may be made from a core portion 33 of azo-type acrylic resin and a cladding portion of epoxy type ultraviolet curable resin.

Figure 10:
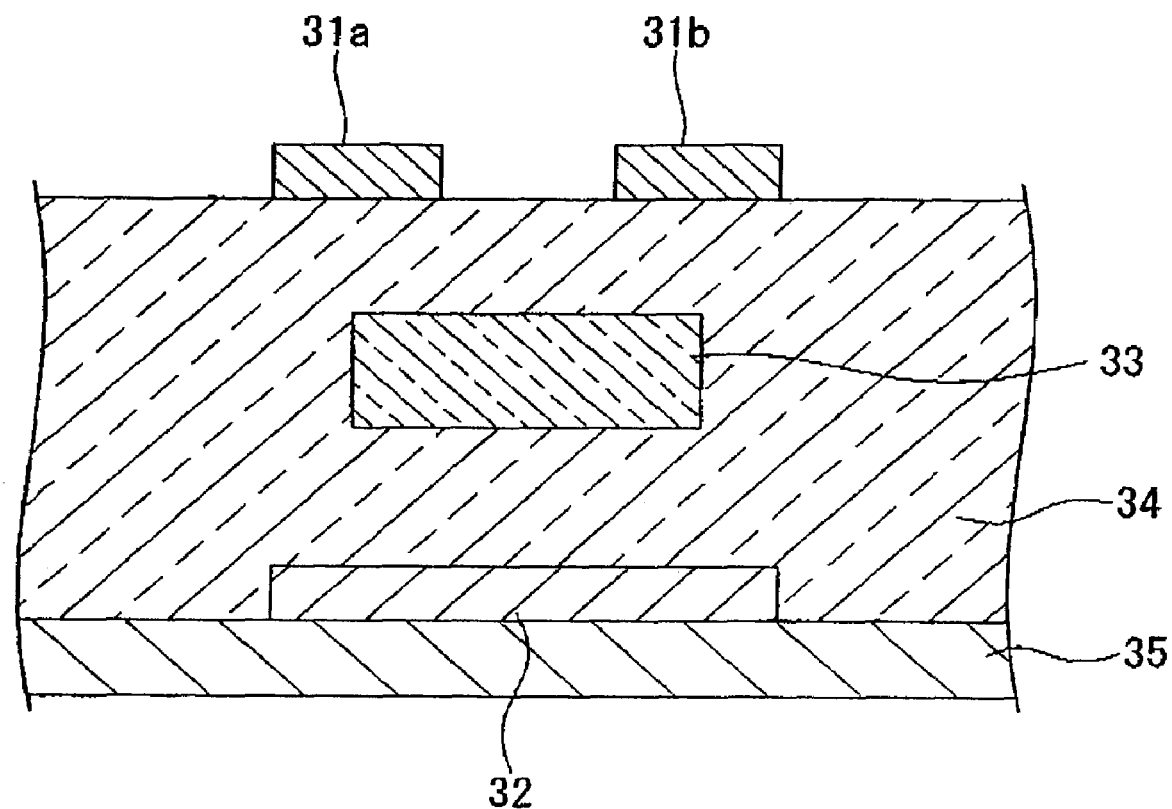
FIG. 10 is a schematic cross sectional view taken in a plane shown by the arrows A—A' in FIG. 9, showing this example of the Y branch portion of the optical switch of the fourth embodiment.

FIG. 10 shows a cross section of FIG. 9 taken in a plane shown by the arrows A—A' in that figure. The refractive index adjustment means comprises a lower portion metal thin film electrode 32 which is formed between the silicon substrate 35 and a cladding portion 34, and a pair of upper portion metal thin film electrodes 31a and 31b which are formed on the upper surface of the cladding portion 34. A conductive thin film or the like is used for the lower portion metal thin film electrode 32 and the upper portion metal thin film electrodes 31a and 31b which constitute the refractive index adjustment means. For this conductive thin film, the same material may be used as was employed in the case of the first embodiment which took advantage of the thermo-optic effect. As shown in FIG. 9, one of each of the upper portion metal thin film electrodes 31a and 31b is provided for each Y branch portion. Electrode pads 36a and 36b for connection wiring are provided at the one ends of the upper portion metal thin film electrodes 31a and 31b respectively, and, as in the first embodiment described above, these are connected to electrode pins of a package case by gold wire bonding, so as to be connected to the positive terminals of external DC sources (not shown in the drawings). Furthermore, the lower portion metal thin film electrode 32 is connected to the minus terminals of these external DC sources, or to a ground terminal (these also are not shown in the drawings). When a voltage is applied between the upper portion metal thin film electrodes 31a and 31b and the lower portion metal thin film electrode 32, it is possible to distribute an electric field over the optical waveguide.

Switching over of the optical path is performed by applying a voltage of a desired value to one or the other of the upper portion metal thin film electrodes 31a and 31b so as to generate an electric field, and thereby utilizing the electro-optic effect to adjust the refractive index of the core portion 33 on the side of the desired one of the optical paths among the two branched paths of the Y branch portion to the desired value. It is possible to implement a two input two output crossbar type optical switch by arranging four of the above described Y branched portions of this fourth embodiment so that they oppose one another, in the same way as was done in the first embodiment described above and shown in FIG. 1. In this fourth embodiment, the upper portion metal thin film electrodes 31a and 31b correspond to the metal thin film heaters of the first embodiment. In the same manner as with the first embodiment, it is possible to set the optical path to the cross state or to the bar state by applying a voltage to those ones among the upper portion metal thin film electrodes 31a and 31b which are positioned on the inner side, or at the outer side, of the Y branch portion, as appropriate. The light output intensity variable attenuation function can be provided by applying a voltage to at least one of the upper portion metal thin film electrodes to which voltage is not being applied in order to perform this switching over of the optical path, and controlling the strength of the electric field by adjusting this voltage value which is applied so as to adjust the refractive index distribution at the branch point of the Y branch portion, thereby emitting a portion of the light which is passing through the optical waveguide out therefrom to the exterior as leakage light.

Since the response time of the electro-optic effect is quick, and moreover the amount of electrical power which it consumes is almost zero. Therefore, with this fourth embodiment, it is possible to implement an optical switch which has a speedy response time, and also which can operate while requiring almost no electrical power.

It is popular to adopt a diffusion waveguide made from lithium niobate if the electro-optic effect is taken advantage of for implementing the refractive index adjustment means as described in this fourth embodiment. Furthermore, a lead lanthanum zirconate titanate optical waveguide (PLZT) as disclosed in the article "PLZT Electro-Optic Waveguides and Switches" by K. Nashimoto et al. in the publication "Optical Fiber Communication Conference 2001, Postdeadline 10, Anaheim, 2001" is also suitable. Moreover, as the polymer material which can be used for the core portion 33 of the optical waveguide, a polymer compound in which a substance which has a large second-order nonlinear susceptibility is dissolved or combined can be applied, as disclosed in Japanese Patent Application, First Publication No. Hei 6-75256. For example, an acrylic ester type resin such as polymethyl methacrylate (P ), a polystyrene resin, a deuteride of these resins, or the like, can be utilized as an example. Furthermore, it is also possible to utilize a substance in which an organic pigment compound made from a stilbene compound, an azo compound, or an azomethine compound such as described in Japanese Patent Application, First Publication Nos. Hei 4-356030, or Hei 5-216079 is dispersed in polymer materials which contain fluorine atoms such as that described in Japanese Patent Application, First Publication No. Hei 5-107577, or a compound in which such organic pigment compound is combined with the side chain of these polymers.

FIFTH EMBODIMENT

Figure 11:
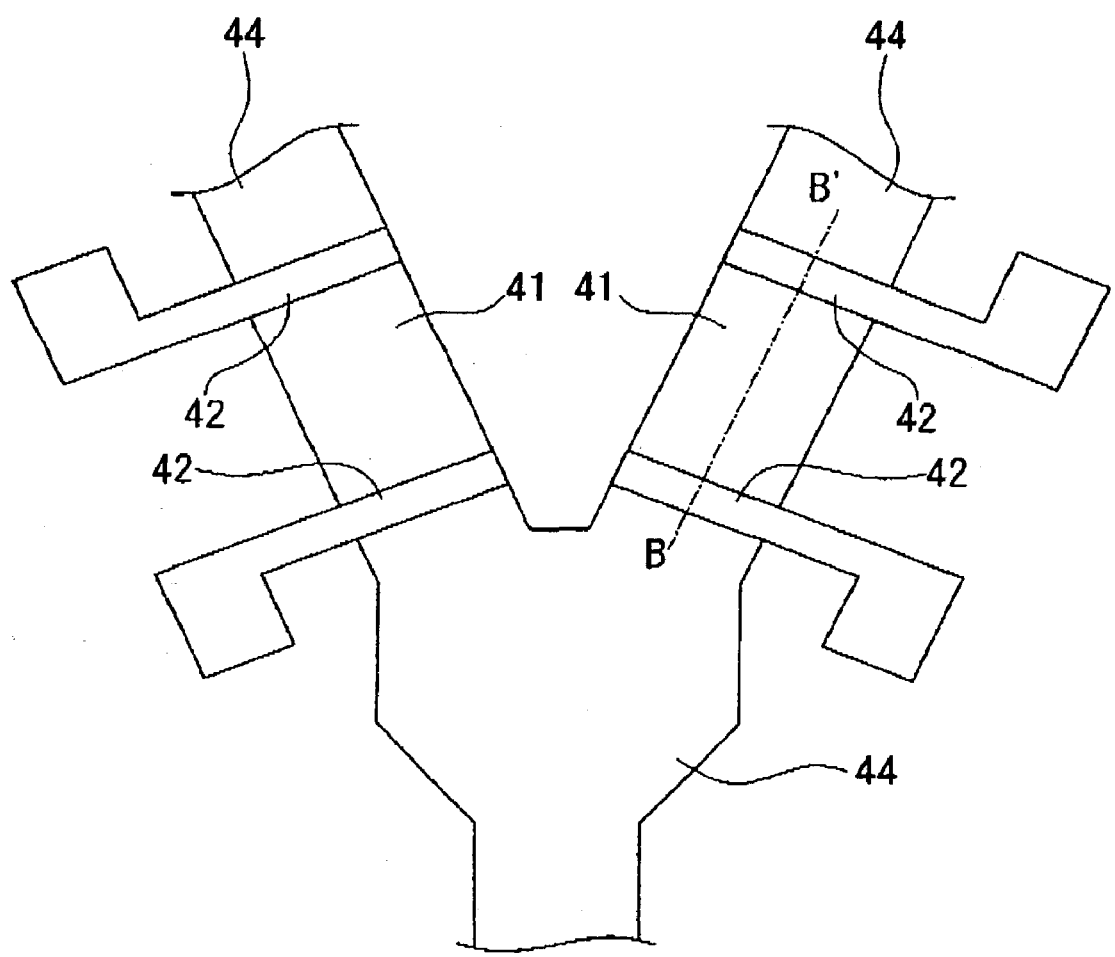
FIG. 11 is a schematic view showing an example of a Y branch portion of the optical switch of a fifth embodiment of the present invention.
Figure 12:
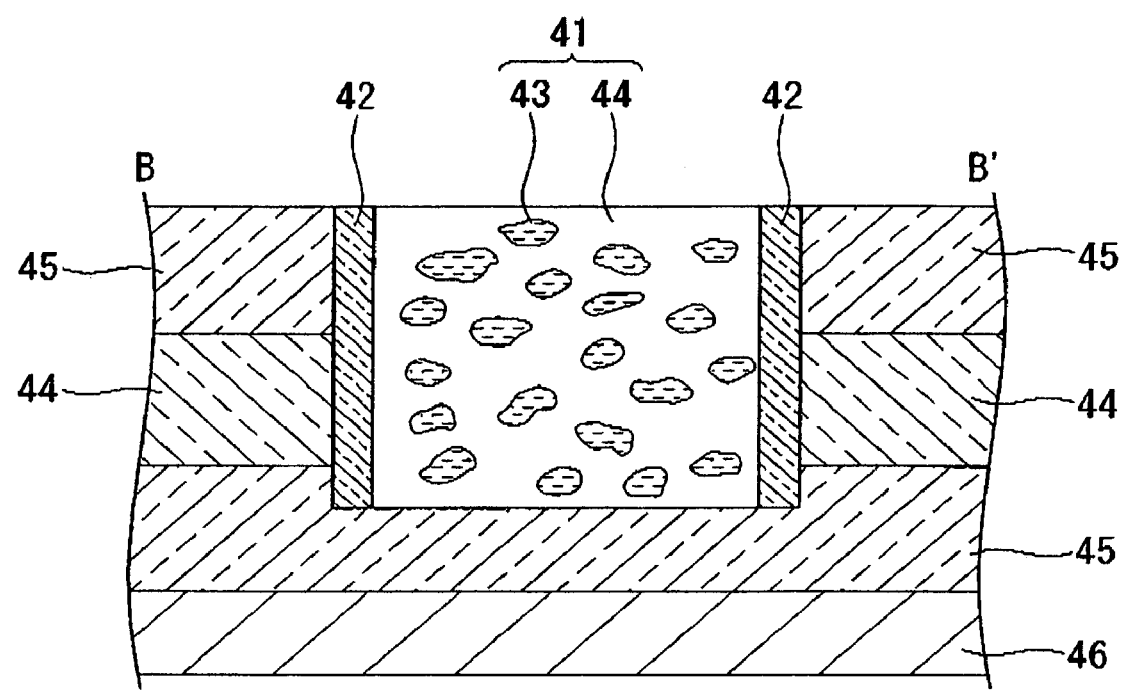
FIG. 12 is a schematic cross sectional view taken in a plane shown by the arrows B—B' in FIG. 11, showing this example of the Y branch portion of the optical switch of the fifth embodiment.

The fifth embodiment of the present invention differs from the first embodiment described above at the point that a portion of the optical waveguide is a liquid crystal, and that the refractive index is adjusted by controlling the orientation state of this liquid crystal. Since the other structures are the same as in the first embodiment shown and described above, detailed explanation thereof will be curtailed herein. FIG. 11 shows an example of the Y branch portion of such an optical switch which takes advantage of the change of refractive index due to the liquid crystal orientation state. The Y branch portion which is used in this fifth embodiment is provided in an optical waveguide which is made up from silica glass or the like, and comprises a liquid crystal layer 41 branched into two branches, one upon each path, and transparent electrodes 42 which constitute a refractive index adjustment means. FIG. 12 shows a cross section of the liquid crystal layer 41 etc. taken in a plane shown by the arrows B—B' in FIG. 11. The optical waveguide is etched away in a rectangular shape so as to expose the cross section of the core portion 44 of the optical waveguide over its whole surface, and the liquid crystal layer 41 and the transparent electrodes 42 are provided in this etched portion so as to constitute the Y branch portion. For the liquid crystal layer 41, a composite layer of polymer dispersed liquid crystal such as, for example, the one described in PCT Patent Application, Publication No. WO87/01822 is used. This composite layer of polymer dispersed liquid crystal has a composition in which minute drops 43 of a liquid crystal material are dispersed in the polymer matrix 44.

As the liquid crystal material, a nematic liquid crystal, a smectic liquid crystal, a chiral nematic liquid crystal including a cholesteric liquid crystal, or any of various other publicly known liquid crystal materials may be used. As the polymer material which constitutes the polymer matrix 44, for example, an acrylic oxidized ester type resin such as polymethyl methacrylate (PMMA) or an epoxy type polymer material may be used. Furthermore, for the transparent electrodes 42, a transparent oxide thin film such as Indium Tin Oxide (ITO), Fluoro-substituted Tin Oxide (FTO) or the like, or a transparent conductive polymer material or the like may be used.

When no voltage is being applied to the pair of transparent electrodes 42, the liquid crystal molecules in the liquid crystal layer 41 are in the non-oriented state, and therefore, the light which is incident from the core portion 44 of the optical waveguide upon the liquid crystal layer 41 is scattered by the interfaces between the polymer matrix 44 and the minute drops 43 of the liquid crystal material, or within the minute drops 43 of the liquid crystal material. And as a result, because of this, the light comes to be blocked by the liquid crystal layer 41. On the other hand, when a voltage is applied across the pair of transparent electrodes 42, the liquid crystal molecules in the liquid crystal layer 41 are oriented in the direction of the electric field, and the liquid crystal layer 41 exhibits a uniform refractive index. As a result, the light comes to be transmitted through the liquid crystal layer 41.

Accordingly, it is possible to perform switching over of the optical path by, among the two paths into which the Y branch portion is branched: for the path along which light is to be propagated, applying a voltage to the transparent electrodes 42 so that the molecules of the liquid crystal in the liquid crystal layer 41 are oriented and the refractive index is made uniform, thereby allowing the transmission of light; and, for the path along which light is not to be propagated, applying no voltage to the transparent electrodes 42, so that the light is scattered by the interfaces between the polymer matrix 44 and the minute drops 43 of the liquid crystal material or within the minute drops 43 of the liquid crystal material, thereby preventing the transmission of light. In this manner, it is possible to implement a two input two output crossbar type optical switch by arranging four of these Y branch portions in opposition to one another as shown in FIG. 1, just as was done in the first embodiment described above. With this fifth embodiment of the present invention, it is possible to set the optical path to the cross state or to the bar state by applying a voltage between the transparent electrodes 42 which are provided to that one of the paths, among the two paths into which the Y branch portion is branched, along which light should be propagated.

Furthermore, since it is possible to adjust the degree of orientation between the liquid crystal molecules in the liquid crystal layer 41 by adjusting the voltage value which is applied between the transparent electrodes 42, it is possible to adjust the uniformity of the refractive index of the liquid crystal layer 41. By doing this, it is possible to adjust the degree of scattering of the light, so that it is possible to control the light transmission characteristic of the liquid crystal layer 41. Accordingly, when implementing the light output intensity variable attenuation function, among the two paths into which at least one of the Y branch portions is branched, no voltage is applied to the transparent electrodes 42 for the path along which light should not be propagated, so that the liquid crystal molecules within the liquid crystal layer 41 upon this path remain in the non oriented state and the refractive index remains non uniform, and due to this the light is scattered, so that the light is intercepted by the liquid crystal layer 41. On the other hand, voltage is applied to the transparent electrodes 42 for the path along which light should be propagated, and the value of this voltage is adjusted, so that the degree of orientation of the liquid crystal molecules within the liquid crystal layer 41 upon this path is adjusted, and thereby the uniformity of the refractive index of the liquid crystal layer 41 upon this path is adjusted, so that the light transmission characteristic can be controlled. Since the orientation state of the liquid crystal molecules can be controlled with only a low consumption of electrical power, it is possible to implement an optical switch according to this fifth embodiment which can be operated with a low electrical power consumption.

What is claimed is:

1. A two input two output type optical switch comprising four one input two output type optical switches which are arranged to oppose one another, each of said one input two output type optical switch comprising a Y branch portion in which one optical waveguide is branched into two optical waveguides, wherein:
two refractive index adjustment means for switching over of an optical path by operating half of said refractive index adjustment means alternately said two refractive index adjustment means are provided in the vicinity of each said Y branch portion; and
at least one of an input port or an output port has a light output intensity variable attenuation means which attenuates by any desired amount the intensity of the light which is being outputted is by operating at least one of said refractive index adjustment means which is not currently being used for switching over of said optical path.

2. An optical switch as described in claim 1, wherein at least one conductive thin film which is positioned in the vicinity of the input port or the output port which is endowed with said light output intensity variable attenuation means is connected to the electrical power source independently of connection wirings for connecting said electrical power source and the other conductive thin films, so as to enable the power supplied to the at least one conductive thin film or the voltage applied to the at least one conductive thin film to be independently adjusted.

3. An optical switch as described in claim 1, wherein the connection wiring for connecting the conductive thin films which are positioned in the vicinity of an input port or an output port which are not endowed with said light output intensity variable attenuation means and the power source is wired to one of terminals for implementing the cross state; terminals for implementing the bar state; and common terminals for ground.

4. An optical switch as described in claim 3, wherein each of said conductive thin film is a metal thin film.

5. An optical switch as described in claim 1, wherein each of said conductive thin film is a metal thin film.

6. An optical switch as described in claim 1, wherein each of said refractive index adjustment means is a heater, and switching over of said optical path is performed by adjusting the amount of heating up of said heaters, thus taking advantage of the thermo-optic effect.

7. An optical switch as described in claim 1, wherein each of said refractive index adjustment means is an electrode which generates an electric field, and switching over of said optical path is performed by adjusting the strength of said electric fields due to said electrodes, thereby taking advantage of the electro-optic effect.

8. An optical switch as described in claim 1, wherein each of said refractive index adjustment means is an electrode which generates an electric field and at least one portion of each of said optical waveguides is made from a liquid crystal, and switching over of said optical path is performed by adjusting the strength of the electric fields due to said electrodes, thus controlling the orientation state of the liquid crystals.

9. An optical add/drop module, comprising a plurality of optical switches as described in claim 1, arranged with at least one input port of each of said optical switches being connected to a wavelength multiplexer and the other input port being connected to an add port, and with at least one output port of each of said optical switches being connected to a wavelength multiplex section and the other output port being connected to a drop port; and wherein switching over of the optical paths of said optical switches is performed by performing switching over between the add/drop operational state and the through operation state, and furthermore light intensity equalization is performed by the light output intensity variable attenuation means for each channel.

10. An optical communication system, wherein wavelength multiplex communication is performed by using an optical add/drop module as described in claim 9.

11. An optical switch as described in claim 1, wherein each of said refractive index adjustment means comprises at least a conductive thin film and an electrical power source which is independently connected to said conductive thin film, and adjusts the refractive index of said optical waveguides by independently applying a voltage to said conductive thin film and adjusting an amount of supplied electrical power or the applied-voltage.

12. A two input two output type optical switch comprising four one input two output type optical switches which are arranged to oppose one another, each of said one input two output type optical switches including a Y branch portion in which one optical waveguide is branched into two optical waveguides, wherein:
two refractive index adjustment means are provided in the vicinity of each said Y branch portions connected to a first electrical power source for switching over of an optical path by half of said refractive index adjustment means functioning alternately, and two of said refractive index adjustment means provided in the vicinity of one of said Y branch portions being connected to a second electrical power source independent of the other refractive index adjustment means and the first electrical power source, providing variable attenuation of the intensity of the light being outputted by independently applying voltage from said second electrical power source to the one of said two of said refractive index adjustment means which is not being used for switching over of said optical path.

13. A method for attenuating a light output intensity of a two input two output type optical switch including four one input two output type optical switches which are arranged to oppose one another, each of said one input two output type optical switches comprising a Y branch portion in which one optical waveguide is branched into two optical waveguides, and two refractive index adjustment means are provided in the vicinity of each said Y branch portions, comprising the steps of:
switching over of an optical path which is performed by half of the refractive index adjustment means functioning alternately; and
variably attenuating a light output intensity of the light, which is being outputted at one of an input port and output port, to any desired amount of the intensity, by operating at least one of the two refractive index adjustment means which is not currently being used for switching over of the optical path.

14. A method for attenuating a light output intensity of the optical switch as described in claim 13, wherein each of the refractive index adjustment means comprises a conductive thin film and an electrical power source which is connected to the conductive thin film, and adjusts the refractive index of the one optical waveguide by applying a voltage to the conductive thin film and adjusting an amount of supplied electrical power or applied voltage.

15. A method for attenuating a light output intensity of the optical switch as described in claim 14, wherein the conductive thin film is positioned in the vicinity of the input port or the output port which is endowed with the light output intensity variable attenuation function is connected to the electrical power source independently of connection wirings for connecting the electrical power source and other conductive thin films, so as to enable the power supplied to the conductive thin film or the voltage applied to the conductive thin film to be independently adjusted.

16. A method for attenuating a light output intensity of the optical switch as described in claim 15, wherein each connection wiring for connecting the other conductive thin films, which are positioned in the vicinity of the input port or the output port and which are not endowed with the light output intensity variable attenuation function, and the power source is wired to one of terminals for implementing the cross state, terminals for implementing the bar state, or common terminals for ground.

17. A method for attenuating a light output intensity of the optical switch as described in claim 15, wherein each of said conductive thin film is a metal thin film.

18. A method for attenuating a light output intensity of the optical switch as described in claim 14, wherein each of said conductive thin film is a metal thin film.

19. A method for attenuating a light output intensity of the optical switch as described in claim 13, wherein each of the refractive index adjustment means is a heater, and switching over of the optical path is performed by adjusting the amount of heating up of the heaters, thereby taking advantage of the thermo-optic effect.

20. A method for attenuating a light output intensity of the optical switch as described in claim 13, wherein each of the refractive index adjustment means is an electrode which generates an electric field, and switching over of the optical path is performed by adjusting the strength of the electric fields due to the electrodes, thereby taking advantage of the electro-optic effect.

21. A method for attenuating a light output intensity of the optical switch as described in claim 13, wherein each of the refractive index adjustment means is an electrode which generates an electric field and at least one portion of each of the optical waveguides is made from a liquid crystal, and switching over of the optical path is performed by adjusting the strength of the electric fields due to the electrodes, thus controlling the orientation state of the liquid crystals.

* * * * *